United States Patent
Endo

(10) Patent No.: US 7,443,426 B2
(45) Date of Patent: Oct. 28, 2008

(54) IMAGE CAPTURING SYSTEM AND CONTROL METHOD OF THE SAME

(75) Inventor: Yoshiyuki Endo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 708 days.

(21) Appl. No.: 11/054,822

(22) Filed: Feb. 10, 2005

(65) Prior Publication Data
US 2005/0179782 A1    Aug. 18, 2005

(30) Foreign Application Priority Data
Feb. 13, 2004  (JP)  .............................. 2004-036811
Apr. 12, 2004  (JP)  .............................. 2004-116936

(51) Int. Cl.
*H04N 5/228*  (2006.01)
(52) U.S. Cl. .................................. 348/222.1
(58) Field of Classification Search ............... 348/222.1
See application file for complete search history.

(56) References Cited
U.S. PATENT DOCUMENTS 5,627,616 A * 5/1997 Sergeant et al. ............. 396/427
6,392,698 B1 * 5/2002 Yokoyama ................ 348/222.1
6,449,007 B1   9/2002 Yokoyama
6,515,271 B1   2/2003 Shimizu
2004/0201693 A1 * 10/2004 Endo ........................ 348/207.1

FOREIGN PATENT DOCUMENTS
JP   9-181936 A   7/1997

* cited by examiner

*Primary Examiner*—David L Ometz
*Assistant Examiner*—Gary C Vieaux
(74) *Attorney, Agent, or Firm*—Canon U.S.A., Inc. I.P. Division

(57) ABSTRACT

An image capturing system includes an image-capturing unit and a main unit, capable of serial communication therebetween. The main unit generates a first clock signal, converts data to be transmitted to the image-capturing unit into serial data using the first clock signal, and transmits the serial data to the image-capturing unit. The image-capturing unit detects a serial transfer frequency from the received serial signal, reproduces the first clock signal, generates a second clock signal from the reproduced first clock signal, converts a taken image into serial data using the second clock signal, and transmits this data to the main unit. The main unit then reproduces the second clock signal from the serial data transmitted from the image-capturing unit, and utilizes the second clock signal to generate the first clock signal, thereby synchronizing the image-capturing unit and the main unit.

1 Claim, 18 Drawing Sheets

FIG. 10 (PRIOR ART)
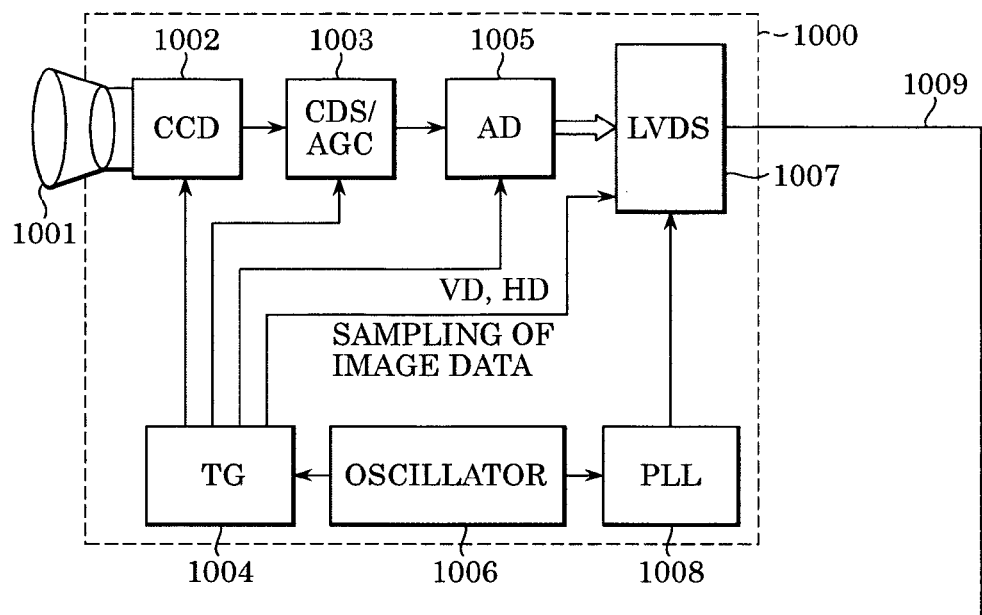
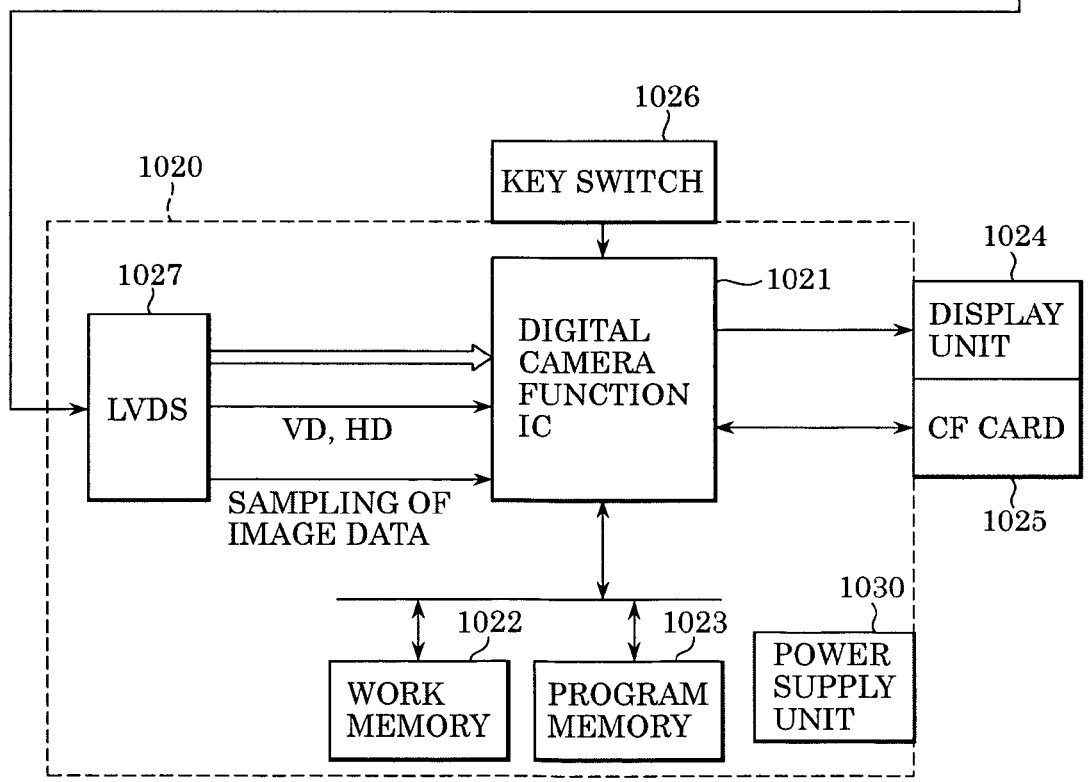

FIG. 15

| | | | |
|---|---|---|---|
| 511 | W1 | HEADER | F9 |
| 512 | W2 | MOTOR SELECT | 01: FOCUS 02: ZOOM 03: CLOSE SHUTTER 04: OPEN SHUTTER 05: CSUB |
| 513 | W3 | AMOUNT OF MOVEMENT OF MOTOR | 00: INITIAL POSITION OTHER THAN 00: RELATIVE POSITION AS TO INITIAL POSITION |
| 514 | W4 | SENSOR SELECT | 01: SOUND SENSOR 02: DOOR SENSOR 03: INFRARED SENSOR |
| 515 | W5 | SENSOR DATA | 00: NO DETECTION 01: SOUND SENSOR 02: DOOR SENSOR 03: INFRARED SENSOR |
| 516 | W6 | CHECK SUM | W1 + W2 + W3 + W4 + W5 + W6 + W7 = FF |
| 517 | W7 | FOOTER | F6 |

IMAGE CAPTURING SYSTEM AND CONTROL METHOD OF THE SAME

BACKGROUND OF THE INVENTION

1. Field of the Invention

The present invention relates to an image capturing system having a configuration wherein a camera unit and a main unit are separate, capable of serial communication between the camera unit and the main unit, and to a control method of the image capturing system.

2. Description of the Related Art

In general, conventional image capturing systems (e.g., separate head type image capturing systems) where the camera unit and the main unit are separated, as disclosed in Japanese Patent Laid-Open No. 10-42176, are arranged (digital data separation type) such that the camera unit comprises a portion which handles the image capture process up to immediately before AD conversion output from a CCD. The camera unit is connected by a cable to the main unit, which performs AD conversion on the output from the CCD. Accordingly, in the event that a user wants to extend the distance between the camera unit and the main unit, a system using a method known as Low Voltage Differential Signaling (LVDS), or IEEE1394, or the like has been used (see Japanese Patent Laid-Open No. 9-181936). An image data transmitting/receiving system for transferring AD-converted digital data using the differential serial method has been also proposed (Japanese Patent Laid-Open No. 2000-333081). Furthermore, as an international digital video data serial output standard, SMPTE292M/259M or TIA/EIA-644 has been employed for image transfer in monitor cameras, PC cameras, and the like.

FIG. 10 is a block diagram illustrating the schematic configuration of a digital camera having a digital data separation-type image capturing system according to a conventional example.

Referring to FIG. 10, reference numeral 1000 denotes a camera unit, 1001 denotes a lens group for inputting an image into a CCD 1002 which is a CCD equivalent to 300,000 through 330,000 pixels for converting an image input from the lens group 1001 into electrical signals. Reference numeral 1003 denotes a CDS/AGC for performing gain adjustment of analog signals output from the CCD 1002, reference numeral 1004 denotes a timing generator (TG in FIG. 10) for outputting a timing signal for driving the CCD 1002, reference numeral 1005 denotes an AD converter (AD in FIG. 10) for converting an output signal from the CDS/AGC 1003 into 12-bit parallel digital data in sync with the timing to be output from the timing generator 1004, and reference numeral 1006 denotes an oscillator for supplying a reference clock for driving the CCD 1002 as to the timing generator 1004. Reference numeral 1006 also denotes a clock serving as the source of an image data sampling signal for a LVDS 1007, which samples 12-bit digital data to be output from the AD 1005 to Phase Lock Loop (PLL) 1008. Transmission-side LVDS 1007 converts digital data converted by the AD converter 1005, a VD (vertical synchronization) signal, and an HD (horizontal synchronization) signal generated by the timing generator 1004 into serial data using the image data sampling signal supplied from PLL 1008, and outputs the serial data to main unit 1020. PLL 1008 generates the image data sampling signal by a clock outputted from the oscillator 1006. Reference numeral 1009 denotes a cable for connecting LVDS 1007 of the camera unit 1000 side with LVDS 1027 of the main unit 1020 side.

Main unit 1020 performs a series of actions as a digital camera, such as displaying image data transmitted from the camera unit 1000, compressing the image data in a JPEG format, and storing the data on a Compact Flash® (CF) card 1025 serving as external storing means as a still image. Reference numeral 1021 denotes a digital camera function IC for performing the above processing of the main unit 1020. Reference numeral 1022 denotes work memory serving as a work region for the digital camera function IC 1021 developing or compressing image data, while reference numeral 1023 denotes program memory storing a program for operating the digital camera function IC 1021. Reference numeral 1024 denotes a liquid crystal display unit to be used for displaying a finder image and confirming an image being shot, reference numeral 1026 denotes a key switch (key SW) unit serving as an interface for performing various types of digital camera operations by an operator, and reference number 1027 denotes a reception-side LVDS circuit for receiving a differential serial signal to be output from the LVDS 1007 of the camera unit 1000 and converting the received data into a reproduced image data sampling signal using the original 12-bit parallel digital data, VD and HD signals, and a clock recovery function within the LVDS. Reference numeral 1030 denotes a power supply unit for supplying a power to the entire system.

With a conventional system example having the configuration illustrated in FIG. 10, the camera unit 1000 transmits image data of 640×480 pixels (VGA size) or 720×480 pixels or so to the main unit 1020 30 times per second, and the main unit 1020 outputs the received image data to the liquid crystal display unit 1024. However, all that the image capturing system, comprising the separate camera unit and the separate main unit where the separate camera unit and separate main unit are connected via a serial signal, can perform is to simply output image data to be output from the camera unit to the display unit of the main unit, or to compress part or all an image to be output to the display unit in a JPEG format.

Thus, a signal related to processing, such as focus control, zoom control, and further various-types sensor control, is not included in signals to be transmitted from the camera unit to the main unit. It is impossible to perform fine operations related to image operations by the operator.

In addition, with still image capturing, in the event that a high-pixel CCD of 2 or 5 million pixels, for example, is employed, there is the need to perform gain control with a fine CDS/AGC for improving image quality, mechanical shutter driving, and focus motor driving. However, with conventional systems, it is impossible to transmit/receive signals other than image data related signals (e.g., 12-bit digital image data, VD signal, HD signal, and image data sampling signal). Accordingly, it is also impossible to perform still image capturing using a high pixel CCD.

Since the reference clock of the camera unit and that of the main unit are not synchronized, there is also the need to perform synchronous processing using software or hardware at the time of displaying an image of the camera unit on the liquid crystal display unit. Even if the camera unit and the main unit include an oscillator respectively so as to operate in the same frequency, it is impractical that the two oscillators have completely the same frequency, and consequently, synchronous processing needs to be performed.

SUMMARY OF THE INVENTION

The present invention has been made in light of solving the aforementioned problems, and provides an image capturing system which allows a user to perform still photography with high image quality, zoom and focus image operations, automatic operations with a sensor, and the like, and the control method thereof. The present invention also provides an image capturing system capable of easily synchronizing between the main unit and the camera unit, and the control method thereof.

As one means for providing such an image capturing system, according to one aspect of the present invention, an image capturing system separately comprises an image-capturing unit and a main unit, wherein serial communication can be performed between the image-capturing unit and the main unit. The main unit comprises a first clock signal generator for generating a first clock signal, a first parallel-to-serial converter for converting data to be transmitted to the image-capturing unit into serial data using the first clock signal, a first transmitter for transmitting the serial data to the image-capturing unit, and a first clock recovering signal for recovering a second clock signal from serial data to be transmitted from the image-capturing unit, and supplying this signal to the clock signal generator. The image-capturing unit comprises a clock recovering device for detecting serial transfer frequency from the received serial signal, and recovering the first clock signal, a second clock signal generator for generating the second clock signal from the recovered first clock signal, and a second transmitter for converting a taken image into serial data using the second clock signal, and transmitting this data to the main unit.

Further features and advantages of the present invention will become apparent from the following description of exemplary embodiments with reference to the attached drawings.

BRIEF DESCRIPTION OF THE DRAWINGS

The details of the image capturing system according to the present invention will become apparent from the following drawings and detailed description based on the drawings.

FIG. 10 is a block diagram illustrating the configuration of a conventional digital camera device.

FIG. 15 is a table showing the content of synchronous serial communication with a micro-controller according to the fourth embodiment of the present invention.

DESCRIPTION OF THE EMBODIMENTS

Description will be made below regarding embodiments of the present invention with reference to the attached drawings in detail.

First Embodiment

Figure 1:
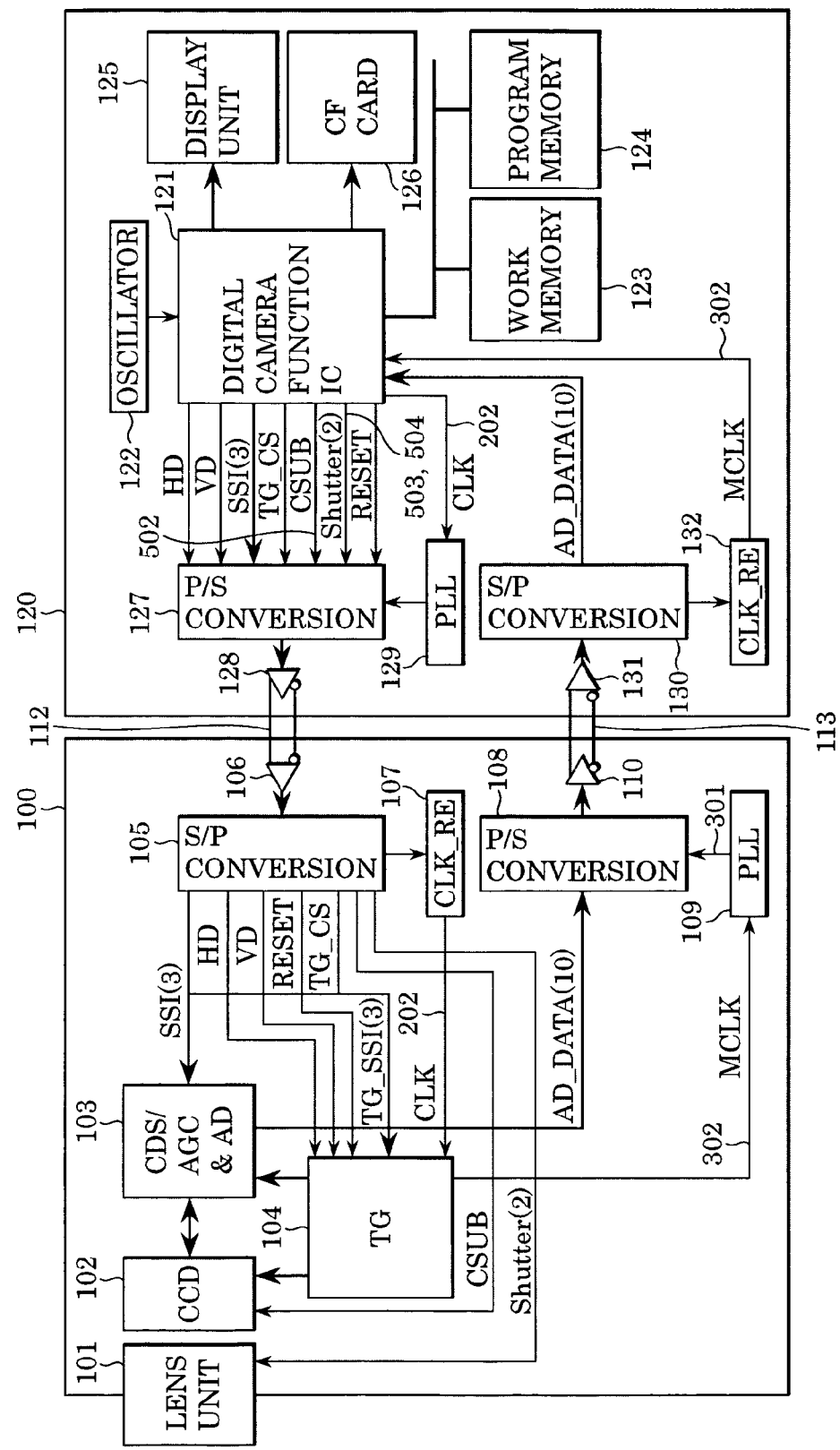
FIG. 1 is a block diagram illustrating the configuration of an image capturing system according to a first embodiment of the present invention.

FIG. 1 is a block diagram illustrating the schematic configuration of a separate-head type image capturing system according to a first embodiment of the present invention.

In FIG. 1, reference numeral 100 denotes a camera unit separated from a main unit 120, 101 denotes a lens unit for inputting an image in a CCD 102, in which a shutter mechanism for performing open/close control using a solenoid valve is built. CCD 102 converts an image to be input from the lens unit 101 into electrical signals. Reference numeral 103 denotes a CDS/AGC&AD for gain-adjusting an analog signal to be output from the CCD 102, and converting the analog signal into a digital signal.

Reference numeral 104 denotes a timing generator (TG) for generating a timing signal for driving the CCD 102 and the CDS/AGC&AD 103. The timing generator 104 inputs a timing generator reference clock (CLK) 202 outputted from a digital camera function IC 121, supplies this signal, which is ½-divided, to the CCD 102 and the CDS/AGC&AD 103 as a CCD 102 driving signal, and also supplies this signal to the digital camera function IC 121 as an image data timing signal (MCLK) 302. In response to this signal, digital camera function IC 121 can obtain synchronization of image data by sampling AD-converted 10-bit image data (AD_DATA (10)) in sync with image data timing signal 302.

Reference numeral 105 denotes a serial-to-parallel converter (S/P conversion) for converting a serial signal inputted from a reception driver 106 into parallel signals, and outputting these signals to the timing generator 104, CDS/AGC&AD 103, CCD 102, and shutter mechanism within the lens unit 101. Reception driver 106 receives a high-speed serial signal outputted from a transmission driver 128 of the main unit 120, and outputs the signal to the serial-to-parallel converter 105. Reference numeral 107 denotes a clock recovery unit (CLK_RE) for determining a latch clock frequency thereof from a serial signal and the number of data bits to be input to the serial-to-parallel converter 105, and outputs the latch clock frequency to the timing generator 104.

Reference numeral 108 denotes a parallel-to-serial converter (P/S conversion) for parallel-inputting AD-converted 10-bit image data (AD_DATA (10)) signals outputted from the CDS/AGC&AD 103, converting these parallel signals using a signal obtained by multiplying an image data timing signal (MCLK) 302 outputted from PLL unit 109 into a serial signal, and outputting the serial signal. PPL unit 109 inputs the image data timing signal (MCLK) 302 outputted from the timing generator 104 as a latch clock, and generates a serial transfer clock 301 necessary for the parallel-to-serial converter performing P/S conversion by multiplying the signal. Reference numeral 110 denotes a transmission driver for externally outputting a serial signal from the parallel-to-serial converter 108 as a high-speed serial signal.

Reference numeral 112 denotes a cable for transferring a high-speed serial signal from the main unit 120 to the camera unit 100, and reference numeral 113 denotes a cable for transferring a high-speed serial signal from the camera unit 100 to the main unit 120.

Reference numeral 121 denotes a digital camera function IC for controlling the entire system based on input from a key switch (not shown) or digitizer (not shown). The digital camera function IC 121 controls the CDS/AGC&AD 103 and timing generator 104 with synchronous serial communication, develops a digital signal to be output from the CDS/AGC&AD 103 as image data, controls exposure or white balance, outputs an electronic view finder image (e.g., 640× 480 dots) to a display unit 125, or generates an image file by encoding a taken image with a predetermined compression method (e.g., JPEG). The digital camera function IC 121 is realized by means of a so-called System On Silicon (SOC) in which logics such as the YC-to-RGB conversion logic of finder data, JPEG compression logic, a memory controller for controlling external memory such as program memory 124 and work memory 123, and the like are built, as well as a microprocessor.

Reference numeral 122 denotes an oscillator for generating a clock for driving the digital camera function IC 121. Work memory 123 for a camera generally consists of SDRAM or SRAM, is connected to the digital camera function IC 121, and used as work memory for JPEG development, image size conversion, or the like. Program memory 124 consists of flash memory or mask memory storing a control program of the digital camera function IC 121. Reference numeral 125 denotes a display unit made up of a TFT-method liquid crystal display, while reference numeral 126 denotes a CF card serving as storage means connected to the digital camera function IC 121 via a dedicated bus by means of a connector.

Reference numeral 127 denotes a parallel-to-serial converter (P/S conversion) for parallel-inputting HD, VD, synchronous serial (SSI), reset signal, CSUB signal 502, and shutter control signals 503, 504, which are output from the digital camera function IC 121, for controlling the timing generator 104, CDS/AGC&AD 103, CCD 102, and shutter mechanism within the lens unit 101, converting these signals into a serial signal using a signal obtained by multiplying a timing generator reference clock 202 outputted from a PLL unit 129, and outputting the serial signal. Reference numeral 128 denotes a transmission driver for externally outputting a serial signal from the parallel-to-serial converter 127 as a high-speed serial signal. PLL unit 129 inputs a timing generator reference clock 202 outputted from the digital camera function IC 121 as a latch clock, and generates a later-described serial transfer clock 201 necessary for the parallel-to-serial converter 127 performing P/S conversion by multiplying the signal.

Reference numeral 130 denotes a serial-to-parallel converter (S/P conversion) for converting a serial signal inputted from a reception driver 131 into parallel signals, and outputting the parallel signals to the digital camera function IC 121. Reception driver 131 receives a high-speed serial signal outputted from the transmission driver 110 of the camera unit 100, and outputs the serial signal to the serial-to-parallel converter 130. Reference numeral 132 denotes a clock recovery unit (CLK_RE) for determining a latch clock frequency thereof from a serial signal, the number of data bits to be input to the serial-to-parallel converter 130, and outputting the latch clock frequency to the digital camera function IC 121.

In FIG. 1, the serial-to-parallel converter 105, reception driver 106, and clock recovery unit 107 make up the reception-side LVDS of the camera unit 100. The parallel-to-serial converter 108, transmission driver 110, and PLL unit 109 make up the transmission-side LVDS of the camera unit 100. Also, the serial-to-parallel converter 130, reception driver 131, and clock recovery unit 132 make up the reception-side LVDS of the main unit 120. The parallel-to-serial converter 127, transmission driver 128, and PLL unit 129 make up the transmission-side LVDS of the main unit 120.

Figure 2:
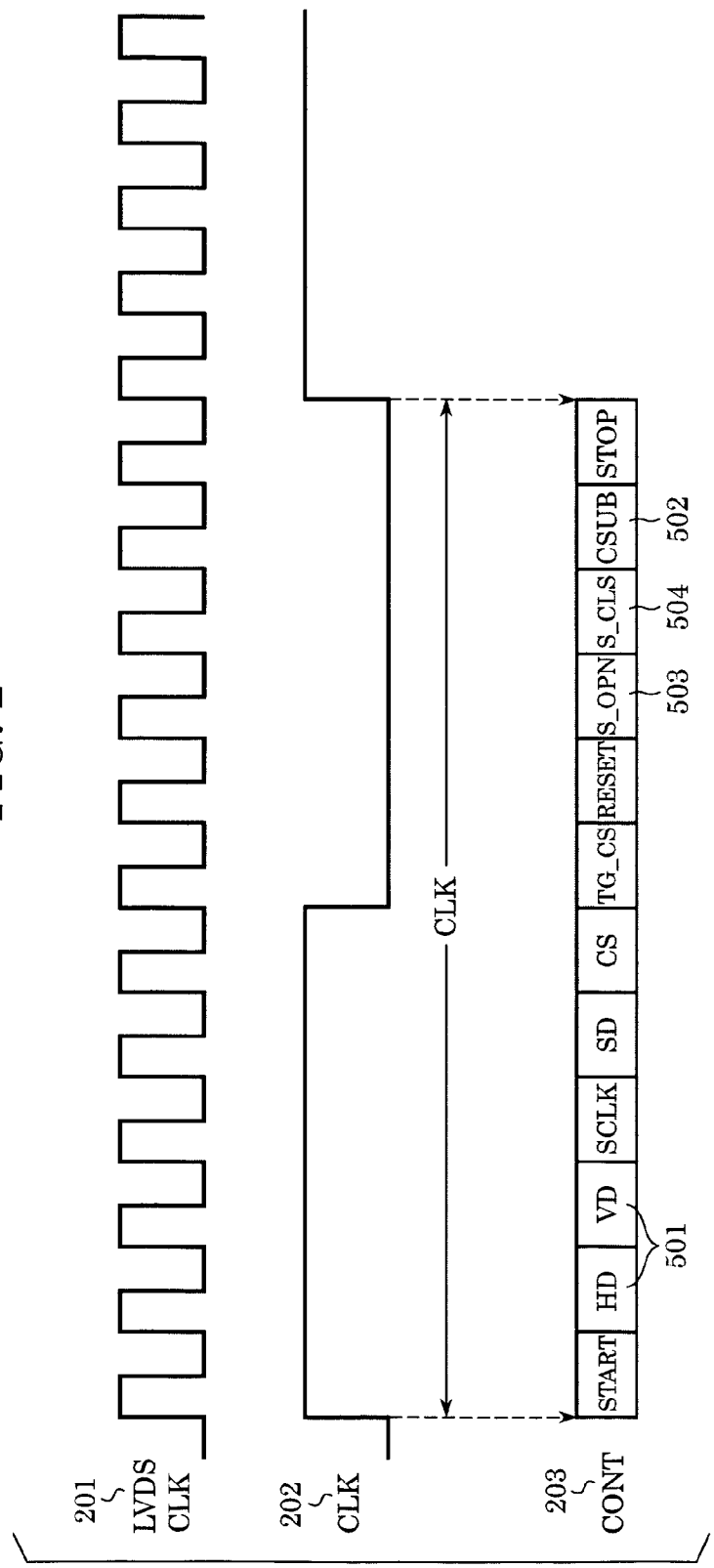
FIG. 2 is a waveform chart illustrating a serial signal to be output from a parallel-to-serial converter 127 according to the first embodiment.

FIG. 2 is a waveform chart illustrating a serial signal outputted from the parallel-to-serial converter 127 according to the present embodiment.

In FIG. 2, reference numeral 201 denotes a serial transfer clock signal (LVDS_CLK), generated by the PLL unit 129, multiplying a timing generator reference clock (CLK) 202 inputted as a latch clock. Timing generator reference clock (CLK) 202 is generated at the digital camera function IC 121. Reference numeral 203 denotes serial data contents (CONT) generated at the digital camera function IC 121 for controlling the timing generator 104, CDS/AGC&AD 103, CCD 102, and shutter mechanism within the lens unit 101 in the event of converting an HD 501/VD 501 synchronous serial/reset signal/CSUB signal 502/shutter control signals 503, and 504 into a serial signal.

The serial transfer clock signal (LVDS_CLK) 201 converts 12 bits in total, obtained by adding start and stop bits to 10 bits (HD 501/VD 501/synchronous serial/reset signal/CSUB 502/shutter control signals 503, 504, and the like) to be parallel-input into a serial signal during one timing generator reference clock (CLK) 202. Accordingly, the relation wherein timing generator reference clock (CLK) 202×total bits (12) =serial transfer clock signal (LVDS_CLK) 201 holds.

Transmission content according to the present embodiment from the digital camera function IC 121 to the camera unit 100 comprises a horizontal synchronization (HD) signal and vertical synchronization (VD) signal for controlling the CCD 102 in a state wherein the timing generator 104 synchronizes with the digital camera function IC 121, a transfer clock (SCLK) of a synchronous serial signal to be output to the CDS/AGC&AD 103 to control gain settings related to AE (Auto Exposure) and AWB (Auto White Balance), synchronous serial data (SD), a chip selection (CS) signal for activating synchronous serial communication, a chip selection signal (TG_CS) for activating synchronous serial communication to be output to the timing generator 104 to control electronic shutter settings related AE and AWB, a reset signal (RESET) for initializing the state of the timing generator 104 at the time of startup, open shutter (S_OPN) 503 and close shutter (S_CLS) 504 signals for controlling the shutter mechanism within the lens unit 101, and a board bias control signal 502 (CSUB) for controlling the board bias level of the CCD 102 at the time of still image capturing. Note that SCLK, SD, and CS are described together as SSI (3) in FIG. 1. In the same way, TG_SSI (3) represents SCLK, SD, and TG_CS as a group.

Note that only the chip selection signal (TG_CS) is output to the timing generator 104 in synchronous serial communication since the transfer clock (SCLK) and synchronous serial data (SD) outputted to the CDS/AGC&AD 103 in synchronous serial communication are shared. Selection of which of the synchronous serial communication to activate is determined based on which of the chip selection signals is selected.

These control signals are sufficiently slow as compared to the timing generator reference clock (CLK) 202, i.e., in the event that the CCD 102 is 200 million pixels, the VD signal is around 30 Hz, the HD signal is around 37 KHz, and the transfer clock (SCLK) is 1 MHz, while the timing generator reference clock (CLK) 202 is 36 MHz. Accordingly, even in the event that these signals are output as usual, and the parallel-to-serial converter 127 latches these signals in sync with the timing generator reference clock (CLK) 202, there is no problem with function whatsoever.

Figure 3:
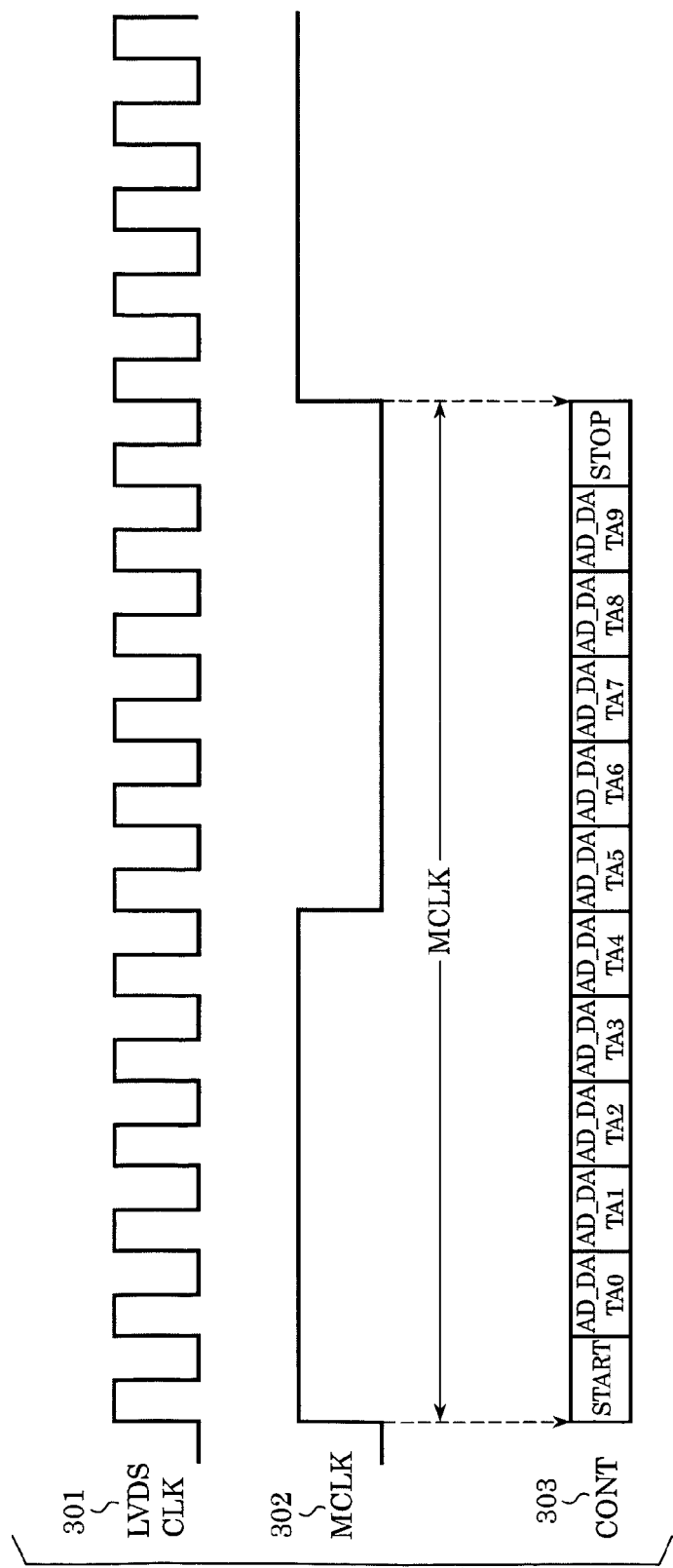
FIG. 3 is a waveform chart illustrating a serial signal to be output from a parallel-to-serial converter 108 according to the first embodiment.

FIG. 3 is a waveform chart illustrating a serial signal outputted from the parallel-to-serial converter 108 according to the first embodiment. In FIG. 3, reference numeral 301 denotes a serial transfer clock signal (LVDS_CLK) generated at the PLL unit 109 by multiplying an image data timing signal (MCLK) 302 inputted as a latch clock. Image data timing signal (MCLK) 302 is generated at the timing generator 104. Reference numeral 303 denotes serial data contents (CONT) in the event of converting AD-converted 10-bit image data (AD_DATA (10)) signals outputted from the CDS/AGC&AD 103 into serial data.

The serial transfer clock signal (LVDS_CLK) 301 converts 12 bits in total obtained by adding start and stop bits to the 10-bit image data (AD_DATA (10)) signals in parallel inputted into serial data during one image data timing signal (MCLK) 302. Accordingly, the relation wherein image data timing signal (MCLK) 302×total bits (12)=serial transfer clock signal (LVDS_CLK) 301 holds. Even in this case, the image data timing signal (MCLK) 302 is synchronized with the 10-bit image data (AD_DATA (10)) signals, so even in the event that the parallel-to-serial converter 108 latches the image data signal in sync with the image data timing signal (MCLK) 302, there is no problem.

Figure 4:
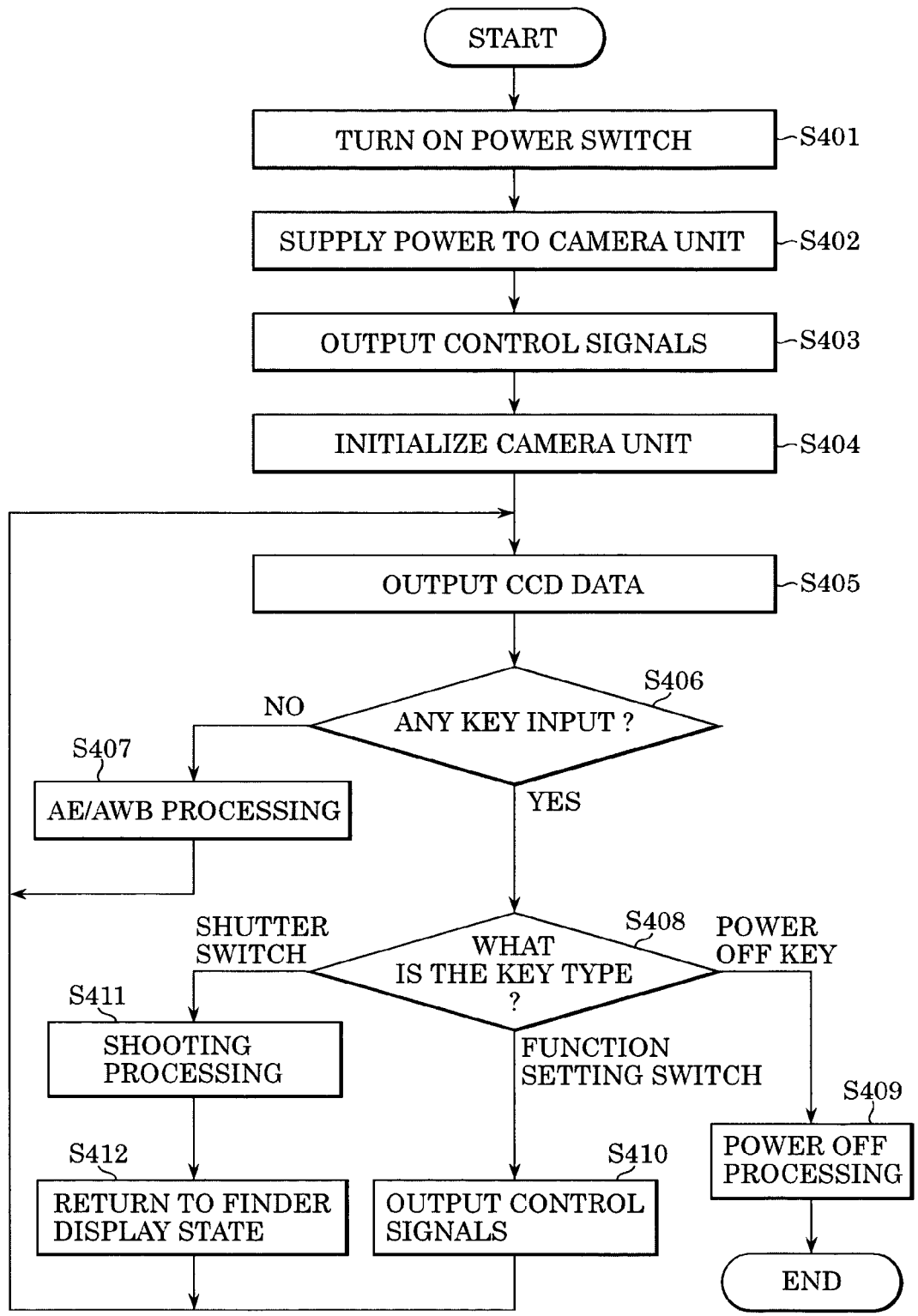
FIG. 4 is a flowchart illustrating the flow of a series of processing from turning on power in the event of connecting a camera unit 100 with a main unit 120, according to the first embodiment.
Figure 5:
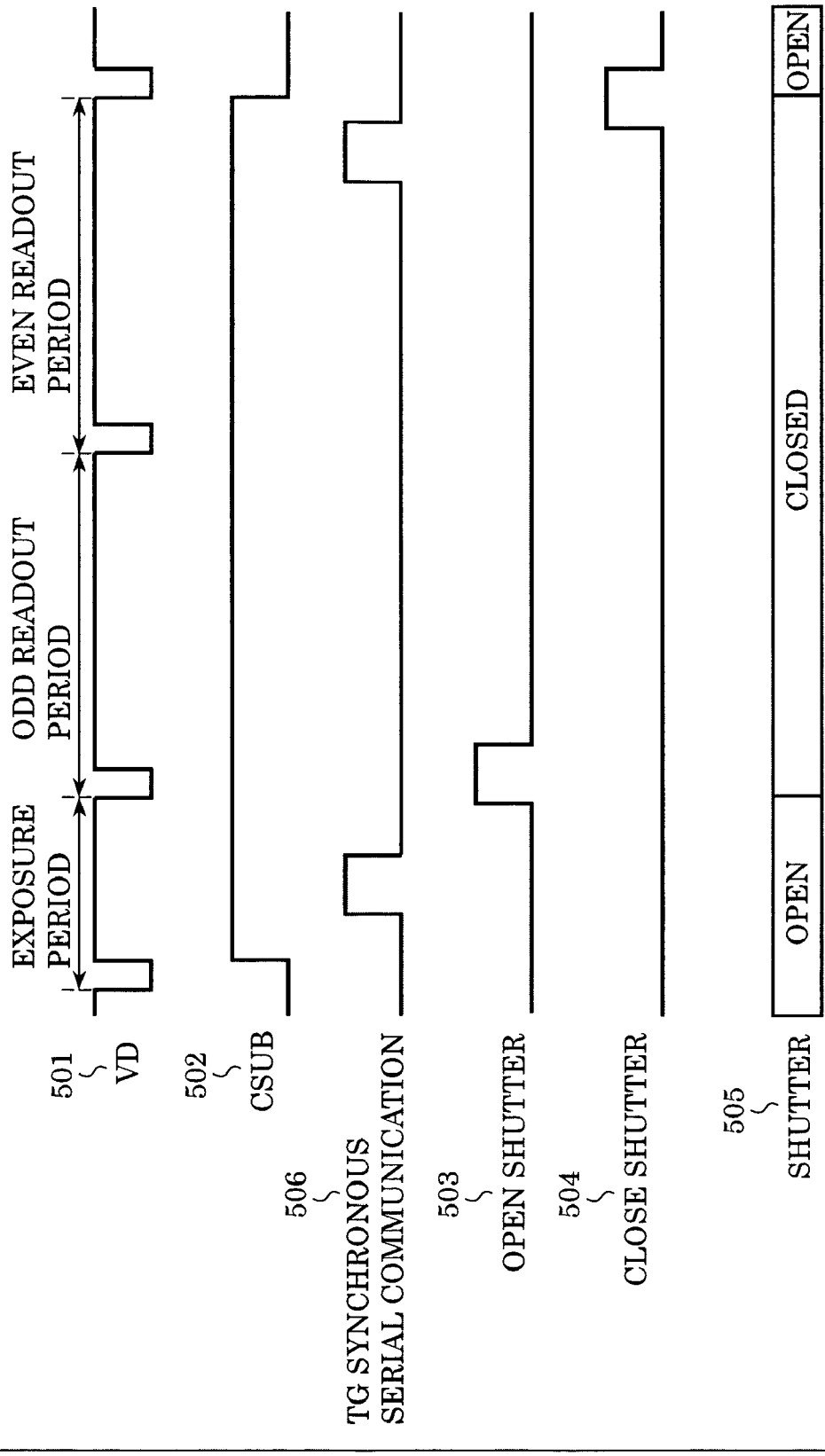
FIG. 5 is a waveform chart illustrating the relation between a VD signal, CSUB signal, and control signal of a shutter mechanism in still image capturing according to the first embodiment of the present invention.

FIG. 4 is a flowchart illustrating the process flow from turning on power when connecting the camera unit with the main unit according to the present embodiment. FIG. 5 is a waveform chart illustrating the relation between the VD signal, CSUB signal, and control signal of the shutter mechanism in still image capturing according to the present embodiment.

Turning to FIG. 5, reference numeral 501 denotes a vertical synchronization (VD) signal outputted from the digital camera function IC 121. Reference numeral 502 denotes a board bias control (CSUB) signal outputted from the digital camera function IC 121. This board bias control signal is a signal for controlling board bias during a still image exposure period and CCD data readout period. Upon this control being performed, the storage electrical charges of the CCD 102 increase, thereby enabling taking an image having a great amount of information. Reference numeral 503 denotes a close shutter signal in the shutter control mechanism of the solenoid valve method within the lens unit 101, while reference 504 denotes an open shutter signal in the shutter control mechanism of the solenoid valve method within the lens unit 101.

Reference numeral 505 illustrates a shutter state transition at the time of controlling the close shutter signal 503 and open shutter signal 504. In the event of still image capturing using the CCD 102, there is a need to close the shutter during a CCD readout period so as to shield incident light to the CCD 102 to prevent occurrence of smearing and loss of color balance. Reference numeral 506 denotes the output timing of synchronous serial communication from the digital camera function IC 121 to the timing generator 104 at the time of still image capturing. The contents of communication performed during an exposure period are for instructions to start actions for a readout period in sync with the next vertical synchronization signal (VD) 501. The contents of communication performed during an EVEN readout period are for instructions to start a normal CCD data output action for electronic view finder in sync with the next vertical synchronization signal (VD) 501.

A description will now be provided regarding the process flow according to the present invention, with reference to FIGS. 1 through 5, when the camera unit 100 and main unit 120 are connected with the cables 112 and 113 and the power is turned on.

Turning to FIG. 4, first, upon an operator pressing the power switch (not shown) of the main unit 120 (Step S401), the digital camera function IC 121 is activated from the sleep mode, performs the initial processing of the main unit 120, and supplies power to the camera unit 100 (Step S402).

Following completion of the initial processing of the main unit 120, the digital camera function IC 121 begins to supply the timing generator reference clock (CLK) 202, and outputs HD and VD signals 501/synchronous serial (SSI and TG_CS signals)/reset signal/CSUB signal 502/shutter control signals 503, 504 for performing initial control of the timing generator 104, CDS/AGC&AD 103, CCD 102, shutter mechanism within the lens unit 101, and display data output (Step S403).

Note that the timing generator reference clock (CLK) 202 is continuously supplied while the camera unit 100 runs. The aforementioned respective control signals are converted into a serial signal, such as the serial data contents 203, by the parallel-to-serial converter 127 to which the serial transfer clock signal (LVDS_CLK) 201 generated by the PLL unit 129 is supplied. The transmission driver 128 outputs the serial signal to the cable 112 as a high-speed serial signal.

Upon the reception driver 106 receiving the high-speed serial signal via the cable 112, the reception driver 106 inputs the serial signal to the serial-to-parallel converter 105. In response to the serial signal, the serial-to-parallel converter 105 converts the serial data of the serial data contents 203 into parallel data, i.e., the original HD and VD signals 501/synchronous serial (SSI and TG_CS signals)/reset signal/CSUB signal 502/shutter control signals 503, 504, and supplies the parallel data to the timing generator 104, CDS/AGC&AD 103, CCD 102, and shutter mechanism within the lens unit 101.

Also, the clock recovery unit 107 returns the timing generator reference clock (CLK) 202 from the frequency of the serial signal and the number of bits of the serial data contents 203, and supplies the timing generator reference clock (CLK) 202 to the timing generator 104. In response to the timing generator reference clock (CLK) 202, the timing generator 104 generates the image data timing signal (MCLK) 302 by dividing this signal into two, supplies the image data timing signal (MCLK) 302 to the PLL unit 109, and also starts to supply a driving reference signal to the CCD 102 and CDS/

AGC&AD 103. Each device within the camera unit 100 to which these control signals and the driving signal are supplied performs initial processing for display data output based on the contents of the signals (Step S404).

Following completion of the initial processing, the image data is output to the CDS/AGC&AD 103 from the CCD 102, the CDS/AGC&AD 103 AD-converts the image data into 10-bit digital image data, and then outputs this to the parallel-to-serial converter 108. The parallel-to-serial converter 108 converts the 10-bit digital image data into a serial data, such as the serial data contents 303, using the serial transfer clock signal (LVDS_CLK) 301 supplied from the PLL unit 109. The transmission driver 110 outputs the serial signal to the cable 113 as a high-speed serial signal (Step S405).

Upon the reception driver 131 receiving the high-speed serial signal via the cable 113, the reception driver 131 inputs the serial signal to the serial-to-parallel converter 130. In response to the serial signal, the serial-to-parallel converter 130 converts the serial signal of the serial data contents 303 into parallel signals, i.e., the original 10-bit parallel digital image data, and supplies the parallel signals to the digital camera function IC 121. Also, the clock recovery unit 132 returns the image data timing signal (MCLK) 302 from the frequency of the serial signal and the number of bits of the serial data contents 303, and supplies the image data timing signal (MCLK) 302 to the digital camera function IC 121.

Through these series of actions, the image data output from the CCD 102 is transferred to the digital camera function IC 121, where the digital camera function IC 121 performs image processing such as AE (Auto Exposure) control, AWB (Auto White Balance) control, or the like (Step S407), and the image data is displayed on the display unit 125 such as a liquid crystal display or the like. This is a finder display state. AE control at this time is realized by the digital camera function IC 121 determining a luminance level calculated based on the image data to be output from the CDS/AGC&AD 103, and changing the register value of the electronic shutter within the timing generator 104, and the register value of gain setting within the CDS/AGC&AD 103 through each synchronous serial communication.

While viewing the image data to be displayed on the display unit 125, the operator performs key operations for still image capturing or function modification operations. While the digital camera function IC 121 performs the display processing in a finder display state, the digital camera function IC 121 always monitors input of various types of operating keys (not shown) (Step S406). In the event that the digital camera function IC 121 detects no key input, the flow proceeds to Step S407, and finder display is performed as described above. On the other hand, in the event that the digital camera function IC 121 detects any key input in the key monitoring state in Step S406, key-type determination processing is performed (Step S408).

In Step S408, in the event that the digital camera function IC 121 detects that the input key is a power-off switch, the digital camera function IC 121 stops display to the display unit 125, stops power supply to the camera unit 100, and performs further power-off processing in which the digital camera function IC 121 itself enters the sleep mode (Step S409). The processing is then completed.

In Step S408, in the event that the digital camera function IC 121 detects that the input key is a function setting switch, and there is a function setting modification (parameter modification) related to the camera unit 100, the digital camera function IC 121 performs a setting modification by outputting the setting contents according to the modification to the timing generator 104 and CDS/AGC&AD 103 using synchronous serial communication (Step S410).

In Step S408, in the event that the digital camera function IC 121 detects that the input key is a shutter switch for instructing still image capturing, the flow proceeds to step S411, where shooting processing occurs.

First, the digital camera function IC 121 performs internal settings for still image capturing such as stopping of automatic exposure (AE) control or automatic white balance (AWB) control, or the like. Next, the digital camera function IC 121 makes the board bias control (CSUB) signal 502 for controlling storage electrical charges during an exposure period a high-level as to the camera unit 100 in sync with change in the vertical synchronization signal (VD) 501. Subsequently, the digital camera function IC 121 performs synchronous serial communication 506 for instructing that a readout period start from the next vertical synchronization signal (VD) 501 as to the timing generator 104. Next, the digital camera function IC 121 outputs the close shutter signal 503 for closing the shutter in sync with change in the next vertical synchronization signal (VD) 501.

As illustrated in FIG. 5, the vertical synchronization signal (VD) 501 outputted from the digital camera function IC 121 becomes a readout period of the CCD 102 data following completion of an exposure period. In the event that the CCD 102 is 200 million pixels, an ODD frame (EVEN frame in some CCDs) readout period is completed during double the exposure period, and one vertical synchronization signal (VD) 501 is output. Next, an EVEN frame (ODD frame in some CCDs) readout period starts, following double the exposure period, one vertical synchronization signal (VD) 501 is output, and a normal action state is recovered. The synchronous serial communication 506 for recovering the timing generator to a normal action state is performed during this EVEN frame (ODD frame in some CCDs) readout period, and further, the open shutter signal 504 is output so as to open the shutter in sync with the next vertical synchronization signal (VD) 501. Finally, upon the digital camera function IC 121 determining that readout of all of the CCD data (serial data contents) 303 is complete, the digital camera function IC 121 makes the board bias control signal (CSUB) 502 a low-level, and also generates a still JPEG image based on all of the CCD data 303 read. The image capturing processing is then completed. The generated JPEG image data is stored, for example, in the CF card 126.

Following generation of the JPEG image, the digital camera function IC 121 modifies the internal settings so as to perform normal finder display, and then returns to a finder display state (Step S412).

As described above, according to the present embodiment, the main unit 120 performs parallel-to-serial conversion regarding the control signals using a frequency obtained by multiplying the reference clock, and outputs the serial signal in response to the serial signal. The camera unit 100 performs serial-to-parallel conversion regarding the control signals, returns the reference clock from the serial signal so as to use this clock as the reference clock of the camera unit 100. In addition, the camera unit 100 performs parallel-to-serial conversion regarding image data using a frequency obtained by multiplying an image data clock generated based on the reference clock to be output from the camera unit 100, and outputs the serial signal, in response to the serial signal. The main unit 120 performs serial-to-parallel conversion regarding the image data, returns the image data clock from the serial signal, and performs sampling of the image data parallel-converted in sync with the image data clock. Thus, employing a convenient configuration allows realization of synchronous processing in an image capturing system in which the main unit 120 and the camera unit 100 are separated.

Second Embodiment

With the above-described first embodiment, the CCD 102 and CDS/AGC&AD 103 are related to image display, the control signals are related to the timing generator 104, and the shutter control signals 503 and 504 are output from the digital camera function IC 121 to the parallel-to-serial converter 127. However, the same function may be realized by other configurations.

The present embodiment focuses attention on the fact that the shutter control signals 503, 504 and the board bias control signal (CSUB) 502 are synchronized with the vertical synchronization signal (VD) 501, the main unit 120 is provided with multiplex output means for multiplexing the shutter control signals 503, 504 and the board bias control signal (CSUB) 502 within the vertical synchronization signal (VD) 501 and outputting, and the camera unit 100 is provided with output analyzing means for separating this multiplexed signal into the original control signals, thereby realizing the same function as the first embodiment while the number of control signals to be transmitted from the digital camera function IC 121 is reduced.

Figure 6:
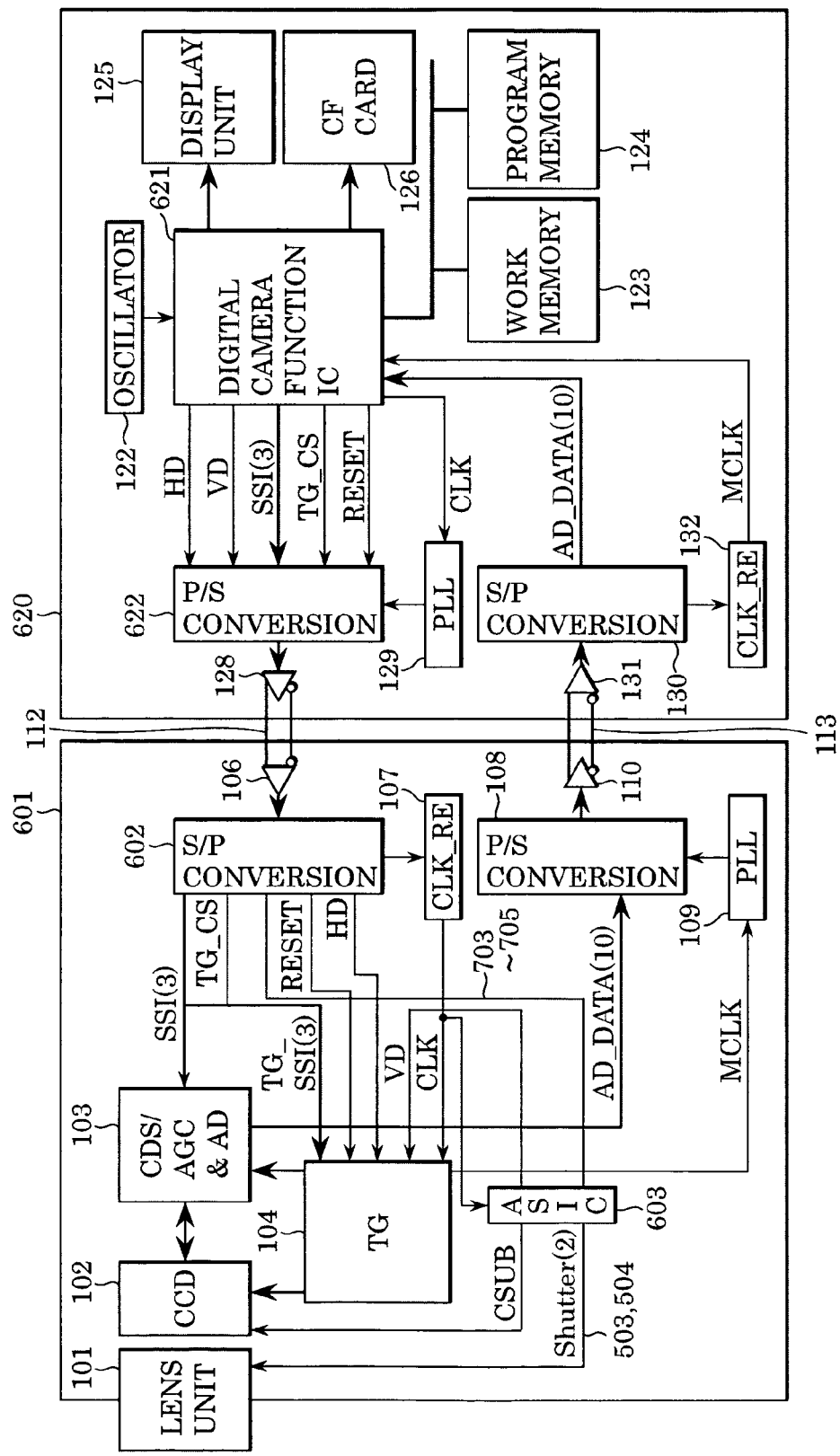
FIG. 6 is a block diagram illustrating the schematic configuration of a separation-type image capturing system according to a second embodiment of the present invention.

FIG. 6 is a block diagram illustrating the schematic configuration of a separation-type image capturing system according to the second embodiment of the present invention. The same components as the first embodiment are denoted with the same reference numerals, and redundant descriptions thereof will be omitted.

In FIG. 6, reference numeral 601 denotes a camera unit according to the second embodiment, reference numeral 602 denotes a serial-to-parallel converter according to the second embodiment, and reference numeral 603 denotes an ASIC serving as an output analyzing unit for recovering the board bias control signal (CSUB) and the shutter control signals 503 and 504, which are multiplexed in the vertical synchronization signal (VD) 501. Reference numeral 620 denotes a main unit according to the second embodiment, and reference numeral 621 denotes a digital camera function IC including a multiplex output function wherein the board bias control signal (CSUB) and the shutter control signals 503 and 504 are multiplexed in the vertical synchronization signal (VD) 501 and output. A configuration equivalent to such a digital camera function IC exists in the digital camera function IC 121 according to the first embodiment and the outside thereof. Accordingly, the same function as the second embodiment may be realized by a combination of this configuration and an ASIC wherein inputting the vertical synchronization signal (VD) 501, board bias control signal (CSUB) 502, and shutter control signals 503 and 504 automatically generates a multiplex signal. Reference numeral 622 denotes a parallel-to-serial converter according to the second embodiment.

Figure 7A:
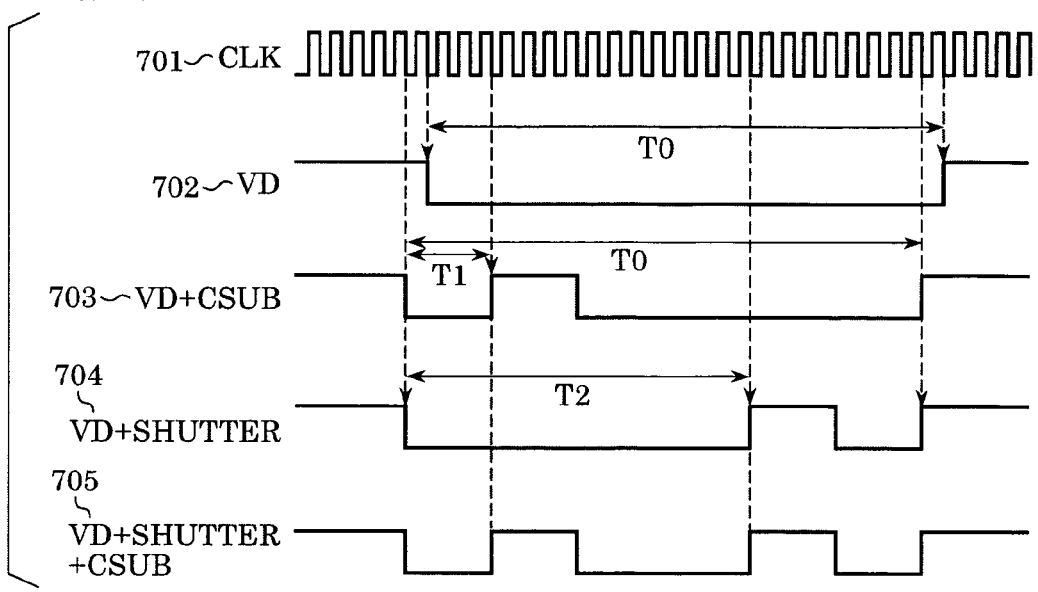
FIG. 7A is a waveform chart illustrating multiplexed signals to be output from a digital camera function IC 621.
Figure 7B:
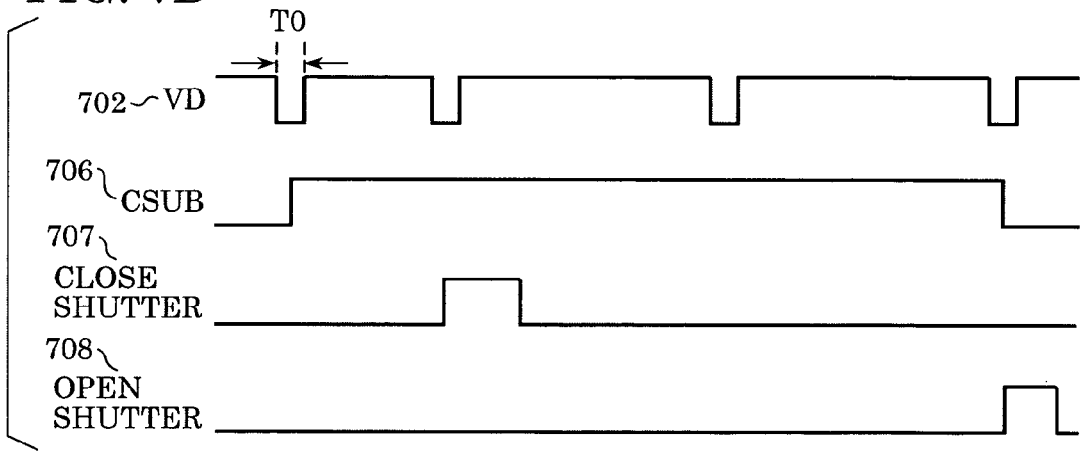
FIG. 7B is a waveform chart illustrating signals recovered by an ASIC 603.
Figure 7C:
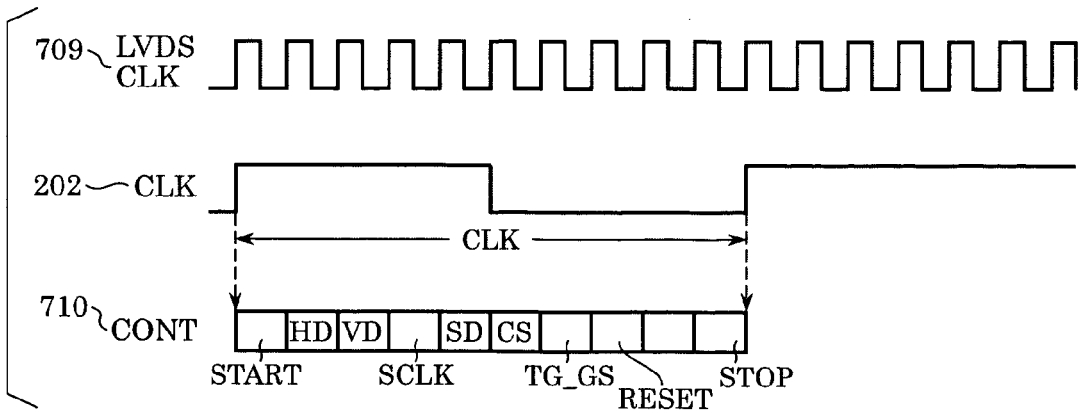
FIG. 7C is a waveform chart illustrating a serial signal to be output from a parallel-to-serial converter 622, according to the second embodiment of the present invention.

FIG. 7A is a waveform chart of multiplexed signals to be output from the digital camera function IC 621. FIG. 7B is a waveform chart of signals recovered by the ASIC 603, and FIG. 7C is a waveform chart of a serial signal to be output from the parallel-to-serial converter 622.

In FIG. 7A, reference numeral 701 denotes a timing generator reference clock (CLK), and the ASIC 603 serving as output analyzing means operates based on this clock. Reference numeral 702 denotes the vertical synchronization signal (VD) recovered by the ASIC 603 serving as output analyzing means. In response to later-described signals 703 through 705, the ASIC 603 generates the vertical synchronization signal (VD) 702, and accordingly, the vertical synchronization signal (VD) 702 is generated with one clock delay by internal processing of the ASIC 603, as illustrated in the drawing. Reference numerals 703 through 705 denote signal waveforms outputted by the digital camera function IC 621, including the multiplex output function. More specifically, reference numeral 703 denotes the case in which the vertical synchronization signal (VD) 702 output is multiplexed with the board bias control signal (CSUB), reference numeral 704 denotes the case in which the vertical synchronization signal (VD) 702 output is multiplexed with the shutter control signals, and reference numeral 705 denotes the case in which the vertical synchronization signal (VD) 702 output is multiplexed with the board bias control signal (CSUB) and the shutter control signals.

Reference numerals 706 through 708 in FIG. 7B denote signal waveforms recovered by the ASIC 603. More specifically, reference numeral 706 denotes the board bias control signal (CSUB), and reference numerals 707 and 708 denote the shutter control signals. Reference numeral 709 in FIG. 7C denotes the serial transfer clock signal (LVDS_CLK), which can be used within the serial-to-parallel converter 602. With the second embodiment, the number of parallel bits is less than that in the first embodiment, and accordingly, the frequency of the serial transfer clock signal (LVDS_CLK) 709 is suppressed in a low frequency as compared to that in the first embodiment. Reference numeral 710 denotes serial data contents (CONT) according to the second embodiment.

Description regarding actions of the image capturing system according to the present embodiment will now be provided with reference to FIGS. 6 and 7.

The digital camera function IC 621 of the present embodiment performs the same actions as the digital camera function IC 121 described in the first embodiment in a normal finder displaying state. However, in the event that the digital camera function IC 621 determines that there is key input, and particularly, that the key is the shutter switch for instructing still image capturing, as described in Step S411 of FIG. 4, the signal 703 in which the vertical synchronization signal (VD) 702 is multiplexed with the board bias control signal (CSUB) 706 during an exposure period and output from a terminal to output the multiplexed vertical synchronization signal (VD) 703.

This multiplexed vertical synchronization signal (VD) 703 is input to the ASIC 603 via the parallel-to-serial converter 622, transmission driver 128, cable 112, reception driver 106, and serial-to-parallel converter 602. In the event that the normal vertical synchronization signal (VD) 702 is assumed as T0 in the timing generator reference clock (CLK) 701, the ASIC 603 detects that the vertical synchronization signal (VD) 702 once becomes low-level, following which a T1 period is elapsed, following which the vertical synchronization signal (VD) 702 becomes high-level for a certain period, whereby the ASIC 603 recognizes that the board bias control signal (CSUB) 706 is multiplexed within the vertical synchronization signal (VD) 702.

Upon the ASIC 603 determining that the vertical synchronization signal (VD) 702 is multiplexed with the board bias control signal (CSUB) 706, the ASIC 603 returns the board bias control signal (CSUB) 706, and makes the board bias control signal (CSUB) 706 high-level.

When an exposure period is complete and a readout period starts, the digital camera function IC 621 outputs the signal 704 in which the vertical synchronization signal (VD) 702 output is multiplexed with the shutter control signals 707, 708 in order to close the shutter. Upon the ASIC 603 detecting that the vertical synchronization signal (VD) 702 once becomes low-level, following which a T2 period (T1>T2 in the present embodiment) is elapsed, following which the vertical synchronization signal (VD) 702 becomes high-level for a certain period, the ASIC 603 recognizes that the close shutter signal 707 is multiplexed within the vertical synchronization signal (VD) 702, and outputs the close shutter signal 707 to the shutter mechanism.

In addition, the digital camera function IC 621 outputs the signal 705 in which the vertical synchronization signal (VD) 702 following completion of a readout period is multiplexed with both the board bias control signal (CSUB) 706 and the shutter control signals 707, 708 in order to control a board bias level and open the shutter. Upon the ASIC 603 detecting that the vertical synchronization signal (VD) 702 once becomes low-level, following which a T1 period is elapsed, following which the vertical synchronization signal (VD) 702 becomes high-level for a certain period, and further detecting that the vertical synchronization signal (VD) 702 once becomes low-level, following which a T2 period is elapsed, following which the vertical synchronization signal (VD) 702 becomes high-level for a certain period, the ASIC 603 recognizes that the board bias control signal (CSUB) 706 and the open shutter control signal 708 are multiplexed within the vertical synchronization signal (VD) 702, changes the board bias control signal (CSUB) 706 into low-level, and also outputs the open shutter signal 708 to the shutter mechanism.

Thus, the present embodiment allows the same advantages as the first embodiment to be achieved while suppressing transfer speed and reducing consumption power by multiplexing an image control signal such as the vertical synchronization signal (VD) 702 outputted to the camera unit 601 from the main unit 620 with another control signal such as the shutter control signal 707, 708, outputting this multiplexed signal to the camera unit 601, and recovering the multiplexed signal in the camera unit 601.

Third Embodiment

With the above-described first embodiment, the CCD and CDS/AGC&AD related to image display, the control signals related to the timing generator, and the shutter control signals are output from the digital camera function IC 121 to the parallel-to-serial converter 127. However, as high-pixelation of CCDs has advanced, building in auto-focus processing with focus motor control has become popular. Accordingly, a focus motor control signal can also be transmitted to the camera unit 100.

The present embodiment allows the focus motor control signal to be transmitted as well as the control signals to be transmitted in the aforementioned embodiments by increasing the number of bits available in the parallel-to-serial converter. In addition, the present embodiment allows a single parallel-to-serial converter to perform processing regardless of presence/absence of focus motor control without unnecessarily increasing the frequency of the serial transfer clock within the parallel-to-serial converter by providing variable-speed processing means in which the number of input bits is changeable.

Figure 8:
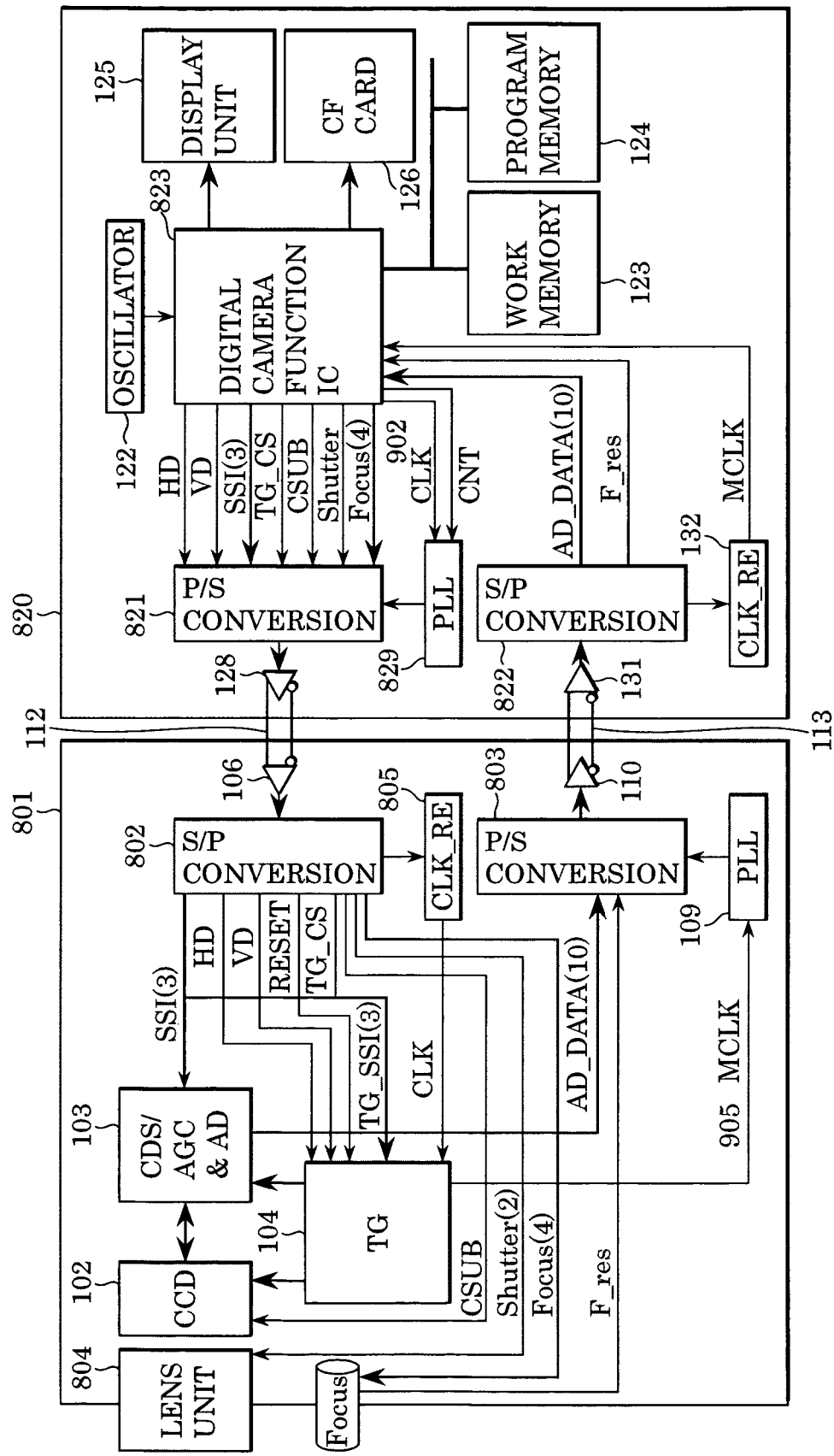
FIG. 8 is a block diagram illustrating the camera unit and the main unit, according to a third embodiment of the present invention.

FIG. 8 is a block diagram illustrating the schematic configuration of an image capturing system according to a third embodiment of the present invention. The same components as the first embodiment are denoted with the same reference numerals, and redundant descriptions thereof are omitted. In FIG. 8, reference numeral 801 denotes a camera unit according to the third embodiment of the present invention, while reference numeral 802 denotes a serial-to-parallel converter capable of switching between 14-bit parallel output and 10-bit parallel output. Reference numeral 803 denotes a parallel-to-serial converter capable of 12-bit parallel input in which an initial position detecting signal (F_res) outputted from a lens unit 804, which includes an auto-focus function, is allowed to be input as well as 10-bit image data (AD_DATA (10)). Reference numeral 804 denotes a lens unit capable of auto-focus control, and includes a stepping motor, photo-sensor for initial position detection, lens for focus adjustment, and the like. Reference numeral 805 denotes a clock recovery (CLK_RE) corresponding to switching between 14-bit parallel output and 10-bit parallel output.

Reference numeral 820 denotes a main unit according to the present embodiment, while reference numeral 821 denotes a parallel-to-serial converter serving as number-of-input-bits variable-speed processing means capable of switching between 14-bit parallel input and 10-bit parallel input. A number-of-input-bits switching control signal to be output from PLL unit 829 controls switching of the number of input bits. Reference numeral 822 denotes a serial-to-parallel converter capable of 12-bit parallel output. A digital camera function IC 823 includes a function for outputting an auto-focus control signal and a number-of-input-bits variable-speed control signal (CNT), as well as the functions of the digital camera function IC 121 according to the first embodiment. PLL unit 829 serves as a number-of-input-bits variable-speed processing means capable of switching the serial transfer clock outputted to the parallel-to-serial converter 821 with the number-of-input-bits variable-speed control signal (CNT) outputted from the digital camera function IC 823, and also outputs a number-of-input-bits switching control signal.

Figure 9:
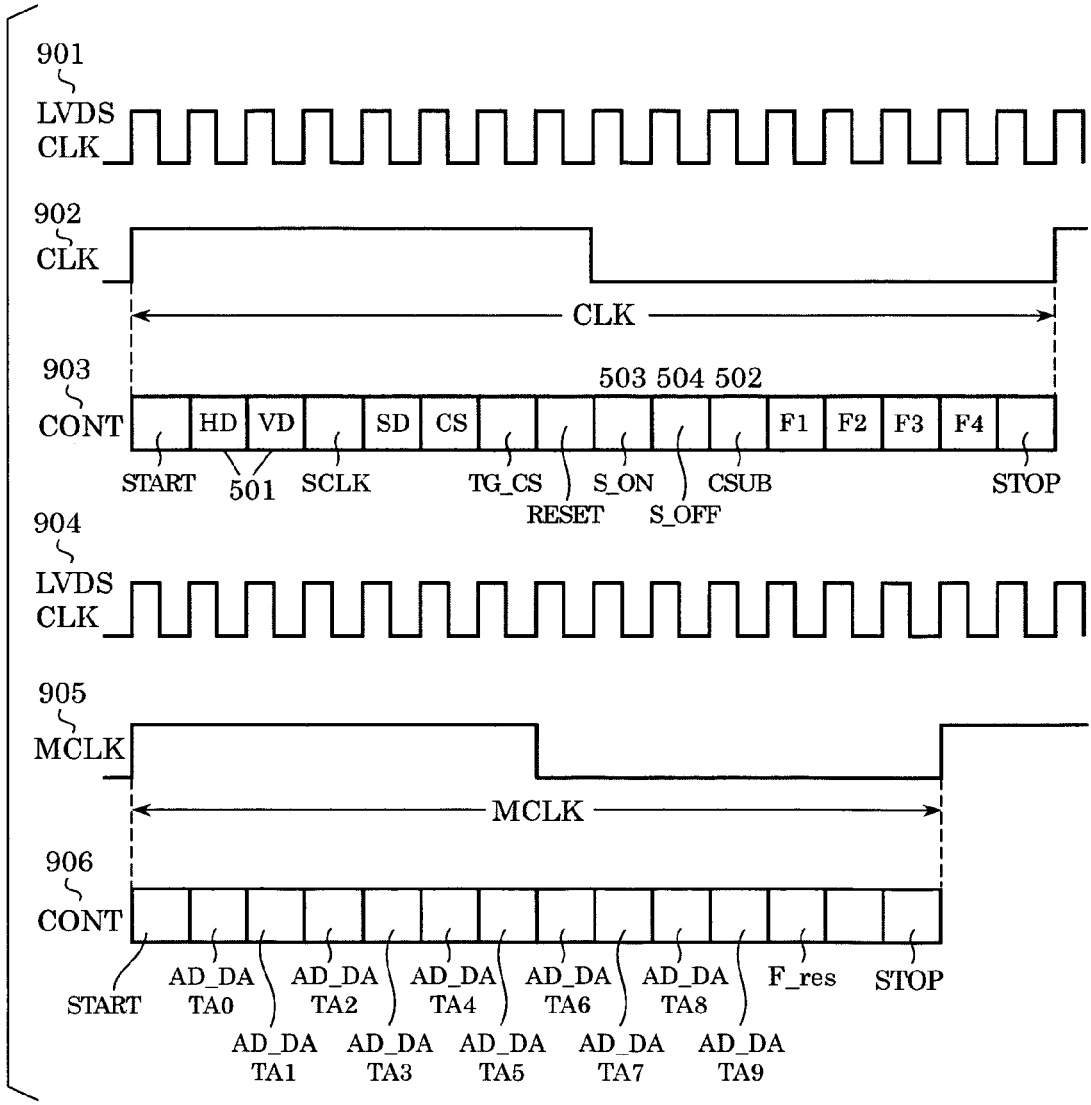
FIG. 9 is a waveform chart illustrating a serial signal to be output from a parallel-to-serial converter 821 and a serial signal to be output from a parallel-to-serial converter 803, according to the third embodiment of the present invention.

FIG. 9 is a waveform chart of a serial signal outputted from the parallel-to-serial converter 821 and a serial signal outputted from the parallel-to-serial converter 803. In FIG. 9, reference numeral 901 denotes a serial transfer clock signal (LVDS_CLK) generated by multiplying a timing generator reference clock (CLK) 902 inputted as a latch clock at the PLL unit 829 serving as the number-of-input-bits variable-speed processing means. The timing generator reference clock (CLK) 902 is generated at the digital camera function IC 823. Reference numeral 903 denotes serial data contents (CONT) in the case where horizontal synchronization signal (HD) 501/vertical synchronization signal (VD) 501/synchronous serial/reset signal/CSUB signal 502/shutter control signals 503 and 504/focus motor control signals F1 through F4, which are generated at the digital camera function IC 823, for controlling the timing generator 104, CDS/AGC&AD 103, CCD 102, shutter mechanism within the lens unit 804, and a focus motor, are converted into serial data.

Reference numeral 904 denotes a serial transfer clock signal (LVDS_CLK), generated by multiplying an image data timing signal (MCLK) 905 inputted as a latch clock at the PLL unit 109. Image data timing signal (MCLK) 905 is generated at the timing generator 104. Reference numeral 906 denotes serial data contents (CONT) when the AD-converted 10-bit image data (AD_DATA) signals to be output from the CDS/AGC&AD 103 and the initial position detecting signal (F_res) are converted into serial data.

Description will now be provided regarding the image capturing system according to the present embodiment with reference to FIGS. 8 and 9. After power is turned on, the digital camera function IC 823 performs processing for detecting the initial position of the focus motor within the lens unit 804 as initial processing (Step S404 in FIG. 4) of the camera unit 801. This is for improving the precision of focus position. Upon the digital camera function IC 823 continuing to move the focus position within the movable region of the lens unit 804, the output from the photo-sensor is changed at a certain position. This changed position becomes the initial position, which allows control from the determined position each time.

In a normal finder display state, the digital camera function IC 823 performs the same actions as the digital camera function IC 121 as described in the first embodiment. However, in the event that the digital camera function IC 823 determines that there is any key input, particularly that the key is the shutter switch for instructing still image capturing, first, the digital camera function IC 823 performs focus processing in the image capturing processing in Step S411 of FIG. 4.

Auto-focus processing can be realized by the digital camera function IC 823 determining a focus state based on adjacent luminance signal difference calculated from image data outputted from the CDS/AGC&AD 103, and controlling the focus motor to move to a position where the luminance signal difference becomes the largest. Focused pictures can be taken by making the transition to still image capturing following completion of the auto-focus processing.

A focus motor control signal pulse is a low-speed pulse, around 1 ms or so, and accordingly, even if this is latched with the high-speed timing generator reference clock (CLK) 902, functionally there is no problem. Also, control of the focus motor is performed only immediately prior to still image capturing. Accordingly, the focus motor control signal is not output in a situation other than immediately prior to still image capturing (fixed to low-level). Under such a situation, the digital camera function IC 823 controls the parallel-to-serial converter 821 to function as a 10-bit parallel-to-serial converter, having the same processing speed as that in the first embodiment, by outputting the number-of-input-bits variable-speed control signal (CNT) to the PLL unit 829. On the other hand, in the event that still image capturing is selected (e.g., the shutter switch is half-pressed), the digital camera function IC 823 switches the number-of-input-bits variable-speed control signal (CNT) prior to control of the focus motor, and outputs this signal to the PLL unit 829. Thus, the parallel-to-serial converter 821 can be switched to 14-bit parallel input, and the control signals including the focus motor control signal output to the parallel-to-serial converter 821.

The serial-to-parallel converter 802 of the camera unit 801 determines whether the number of transmission bits is 10 bits or 14 bits by detecting the start bit and stop bit of the received serial data, and outputs 10-bit parallel data or 14-bit parallel data depending on the received data.

Thus, the present embodiment allows image control and motor control to be simultaneously performed while suppressing transfer speed and reducing consumption power by multiplexing the control signals to be output to the camera unit 801 from the main unit 820 with a signal for controlling the motor included in the camera unit 801, and outputting the multiplexed control signals.

In addition, adding the number-of-input-bits variable means to the parallel-to-serial converter 821 of the main unit 820 allows the number of processing bits to be suppressed when unnecessary, thereby suppressing transfer speed and reducing consumption power.

Fourth Embodiment

Figure 11:
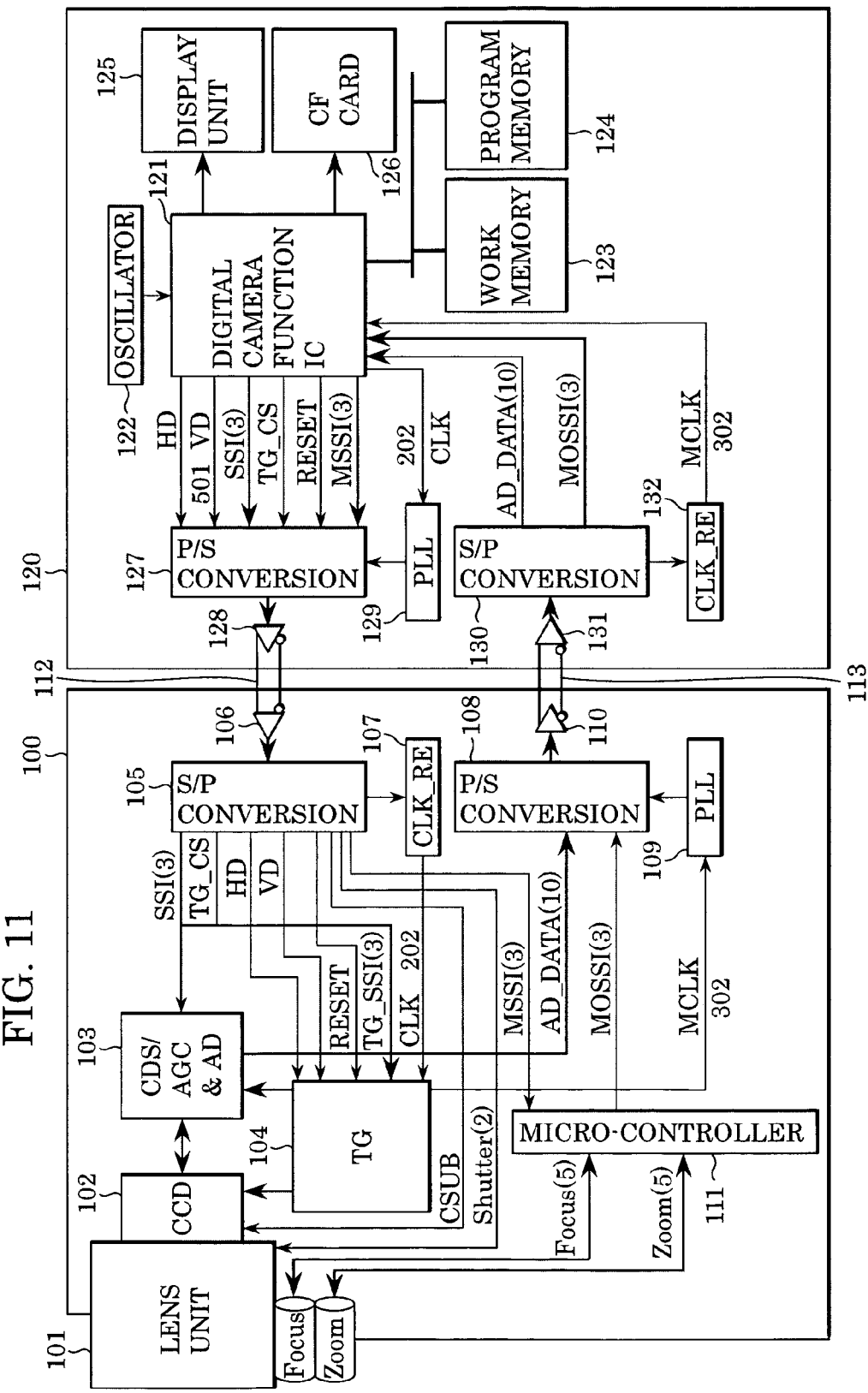
FIG. 11 is a block diagram illustrating the configuration of an image capturing system according to a fourth embodiment of the present invention.

FIG. 11 is a block diagram illustrating the configuration of a separate type image capturing system according to a fourth embodiment of the present invention. In FIG. 11, reference numeral 100 denotes a camera unit separated from a main unit, and reference numeral 101 denotes a lens unit for inputting an image in CCD 102, which includes a shutter mechanism for performing open/close control using a solenoid valve, a focus motor for driving an auto-focus mechanism with a stepping motor, and a zoom motor for driving a zoom mechanism with a DC motor or stepping motor. CCD 102 converts an image inputted from the lens unit 101 into electrical signals. Reference numeral 103 denotes a CDS/AGC&AD for gain-adjusting an analog signal outputted from the CCD 102, and converting the analog signal into a digital signal.

Reference numeral 104 denotes a timing generator (TG) for generating a timing signal for driving the CCD 102 and the CDS/AGC&AD 103. The timing generator 104 inputs a timing generator reference clock (CLK) 202 outputted from a digital camera function IC 121, and supplies this signal, which is ½-divided, to the CCD 102 and the CDS/AGC&AD 103 as a CCD 102 driving signal. Timing generator 104 also supplies the timing generator reference clock signal 202 to digital camera function IC 121 as an image data timing signal (MCLK) 302. In response to this signal, digital camera function IC 121 can obtain synchronization of image data by sampling AD-converted 10-bit image data (AD_DATA (10)) in sync with the image data timing signal (MCLK) 302.

Reference numeral 105 denotes a serial-to-parallel converter (S/P conversion) for converting a serial signal inputted from a reception driver 106 into parallel signals, and outputting these signals to the timing generator 104, CDS/AGC&AD 103, CCD 102, and shutter mechanism within the lens unit 101. Reception driver 106 receives a high-speed serial signal outputted from a transmission driver 128 of main unit 120, and outputting the signal to the serial-to-parallel converter 105. Reference numeral 107 denotes a clock recovery unit (CLK_RE) for determining a latch clock frequency thereof from a serial signal and the number of data bits to be input to the serial-to-parallel converter 105, and outputs the latch clock frequency to the timing generator 104.

Reference numeral 108 denotes a parallel-to-serial converter (P/S conversion) for parallel-inputting AD-converted 10-bit image data (AD_DATA (10)) signals output from the CDS/AGC&AD 103, converting these parallel signals using a signal obtained by multiplying an image data timing signal (MCLK) 302 outputted from a PLL unit 109 into a serial signal, and outputting the serial signal. PLL unit 109 inputs an image data timing signal (MCLK) 302 outputted from the timing generator 104 as a latch clock, and generates a serial transfer clock 301 necessary for the parallel-to-serial converter performing P/S conversion by multiplying the signal. Reference numeral 110 denotes a transmission driver for external-outputting a serial signal to be output from the parallel-to-serial converter 108 as a high-speed serial signal.

Reference numeral 111 denotes a micro-controller for performing motor control in response to synchronous serial communication signal (MSSI) outputted from the digital camera function IC 121. The micro-controller 111 analyzes the content of synchronous serial communication outputted from the digital camera function IC 121, and continues to output a signal necessary for moving the motor selected by motor selection data 512 to the position specified by position data 513 to each motor within the lens unit 101. Following completion of a predetermined amount of movement, the micro-controller 111 sets the data following completion of movement to position data 513, and outputs this data to the digital camera function IC 121 using synchronous serial communication.

Reference numeral 112 denotes a cable for transferring a high-speed serial signal from the main unit 120 to the camera unit 100, and reference numeral 113 denotes a cable for transferring a high-speed serial signal from the camera unit 100 to the main unit 120.

Digital camera function IC 121 controls corresponding equipment based on input from a key switch (not shown) or digitizer (not shown), controls the CDS/AGC&AD 103 and timing generator 104 by synchronous serial communication, generates a digital signal outputted from the CDS/AGC&AD 103 as image data, controls exposure or white balance, outputs an electronic view finder image (e.g., 640×480 dots) to a display unit 125, or generates a JPEG file of a taken image. This digital camera function IC 121 is a so-called System On Silicon (SOC), in which logics such as the YC-to-RGB conversion logic of finder data, JPEG compression logic, a memory controller for controlling external memory such as program memory 124 and work memory 123, and the like are built, as well as a microprocessor.

Reference numeral 122 denotes an oscillator for generating a clock for driving the digital camera function IC 121. Work memory 123 is primarily made up of SDRAM or SRAM, which is connected to the digital camera function IC 121, and used as work memory for JPEG development, image size conversion, or the like. Program memory 124 is made up of flash memory or mask memory storing a control program of the digital camera function IC 121. Display unit 125 is made up of a TFT-method liquid crystal display. Reference numeral 126 denotes a CF card serving as storage means to be connected to the digital camera function IC 121 via a dedicated bus by means of a connector.

Reference numeral 127 denotes a parallel-to-serial converter (P/S conversion) for parallel-inputting an HD/VD/synchronous serial/reset signal/CSUB signal/shutter control signals for controlling the timing generator 104, CDS/AGC&AD 103, CCD 102, or shutter mechanism within the lens unit 101, converting these signals into a serial signal using a signal obtained by multiplying a timing generator reference clock 202 outputted from a PLL unit 129, and outputting the serial signal. Reference numeral 128 denotes a transmission driver for externally-outputting a serial signal outputted from the parallel-to-serial converter 127 as a high-speed serial signal. PLL unit 129 inputs timing generator reference clock 202 outputted from the digital camera function IC 121 as a latch clock, and generates a serial transfer clock 201 necessary for the parallel-to-serial converter 127 performing P/S conversion by multiplying the signal.

Reference numeral 130 denotes a serial-to-parallel converter (S/P conversion) for converting a serial signal inputted from a reception driver 131 into parallel signals, and outputting the parallel signals to the digital camera function IC 121. Reference numeral 131 denotes a reception driver for receiving a high-speed serial signal outputted from the transmission driver 110 of the camera unit 100, and outputting the serial signal to the serial-to-parallel converter 130. Reference numeral 132 denotes a clock recovery unit (CLK_RE) for determining a latch clock frequency thereof from a serial signal and the number of data bits to be input to the serial-to-parallel converter 130, and outputs the latch clock frequency to the digital camera function IC 121.

In FIG. 11, the serial-to-parallel converter 105, reception driver 106, and clock recovery unit 107 make up the reception-side LVDS of the camera unit 100. The parallel-to-serial converter 108, transmission driver 110, and PLL unit 109 make up the transmission-side LVDS of the camera unit 100. The serial-to-parallel converter 130, reception buffer unit 131, and clock recovery unit 132 make up the reception-side LVDS of the main unit 120. The parallel-to-serial converter 127, transmission driver 128, and PLL unit 129 make up the transmission-side LVDS of the main unit 120.

Figure 12:
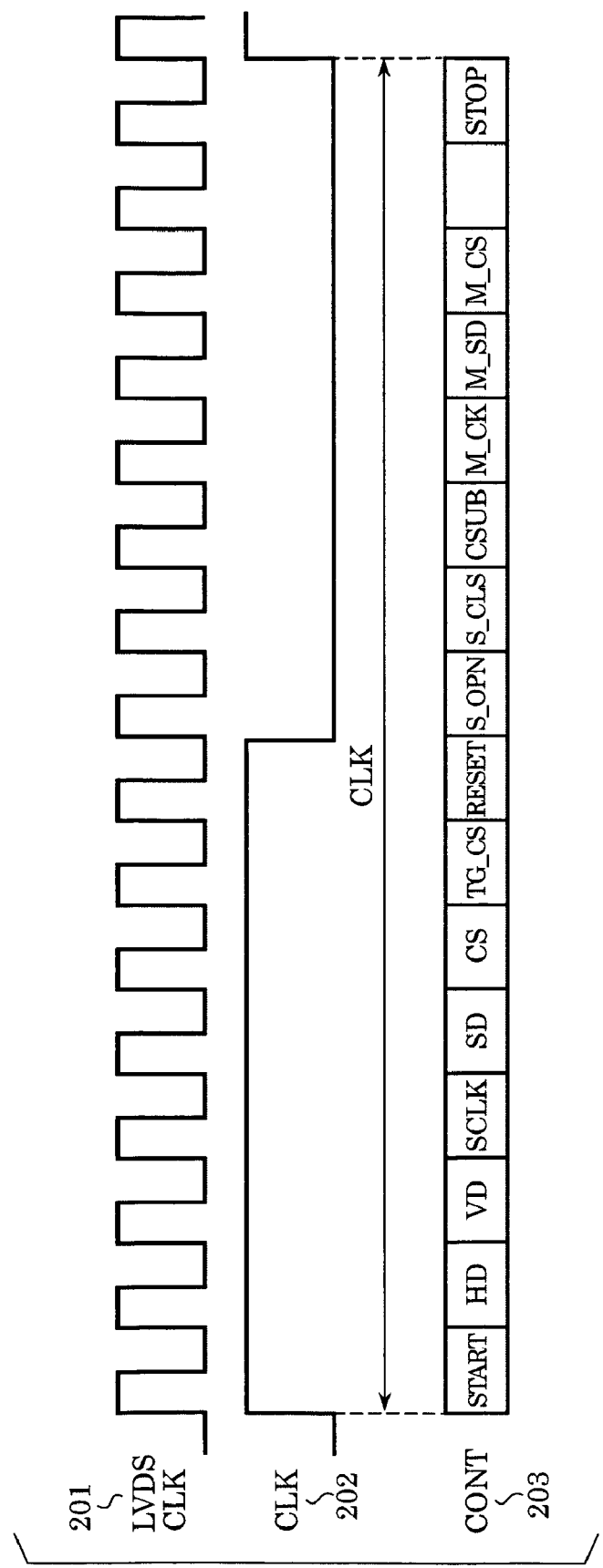
FIG. 12 is a waveform chart illustrating a serial signal to be output from a parallel-to-serial converter 127 according to the fourth embodiment.

FIG. 12 is a waveform chart illustrating a serial signal to be output from the parallel-to-serial converter 127 according to the present embodiment. In FIG. 12, reference numeral 201 denotes a serial transfer clock signal (LVDS_CLK) generated by the PLL unit 129 multiplying a timing generator reference clock (CLK) 202 inputted as a latch clock. Timing generator reference clock 202 is generated at the digital camera function IC 121, as is serial data contents (CONT) 203. Both timing generator reference clock 202 and serial data contents 203 are used to control the timing generator 104, CDS/AGC&AD 103, CCD 102, and shutter mechanism within the lens unit 101 in the event of converting a horizontal synchronization signal (HD)/vertical synchronization signal (VD)/synchronous serial/reset signal/CSUB signal/shutter control signals/motor control synchronous serial into a serial signal.

The serial transfer clock signal (LVDS_CLK) 201 converts 16 bits in total, which is obtained by adding start and stop bits to 14 bits (horizontal synchronization signal (HD)/vertical synchronization signal (VD)/synchronous serial/reset signal/CSUB/shutter control signals/motor control synchronous serial) to be parallel-input into a serial signal during one timing generator reference clock (CLK) 202. Accordingly, the relation wherein timing generator reference clock (CLK) 202×total bits (16)=serial transfer clock signal (LVDS_CLK) 201 holds.

Transmission content according to the present embodiment from the digital camera function IC 121 to the camera unit 100 comprises a horizontal synchronization (HD) signal and vertical synchronization (VD) signal for controlling the CCD 102 in a state wherein the timing generator 104 synchronizes with the digital camera function IC 121, a transfer clock (SCLK) of a synchronous serial signal outputted to the CDS/AGC&AD 103 to control gain settings related to AE (Auto Exposure) and AWB (Auto White Balance), synchronous serial data (SD), a chip selection (CS) signal for activating synchronous serial communication, a chip selection signal (TG_CS) for activating synchronous serial communication to be output to the timing generator 104 to control electronic shutter settings related to AE and AWB, a reset signal (RESET) for initializing the state of the timing generator 104 at the time of startup, open shutter (S_OPN) and close shutter (S_CLS) signals for controlling the shutter mechanism within the lens unit 101, a board bias control signal (CSUB) for controlling the board bias level of the CCD 102 at the time of still image capturing, a synchronous serial communication transfer clock (M_CK) for controlling the micro-controller 111, synchronous serial data (M_SD), and a chip selection signal (M_CS) for activating synchronous serial communication.

Note that only the chip selection signal (TG_CS) is output to the timing generator 104 in synchronous serial communication as a serial communication signal since the transfer clock (SCLK) and synchronous serial data (SD) to be output to the CDS/AGC&AD 103 in synchronous serial communication are shared. Which synchronous serial communication to activate is determined depending on which of the chip selection signals is selected. In addition, the number of bits to be input to the parallel input ports of the parallel-to-serial converter 127 should be an even number.

These control signals are sufficiently slow as compared to the timing generator reference clock (CLK) 202, i.e., in the event that the CCD 102 is 200 million pixels, the VD signal is around 30 Hz, the HD signal is around 37 KHz, and the transfer clock (SCLK or M_CK) is 1 MHz, while the timing generator reference clock (CLK) 202 is 36 MHz. Accordingly, even in the event that these signals are output as usual, and the parallel-to-serial converter 127 latches these signals in sync with the timing generator reference clock (CLK) 202, functionally there is no problem.

Figure 13:
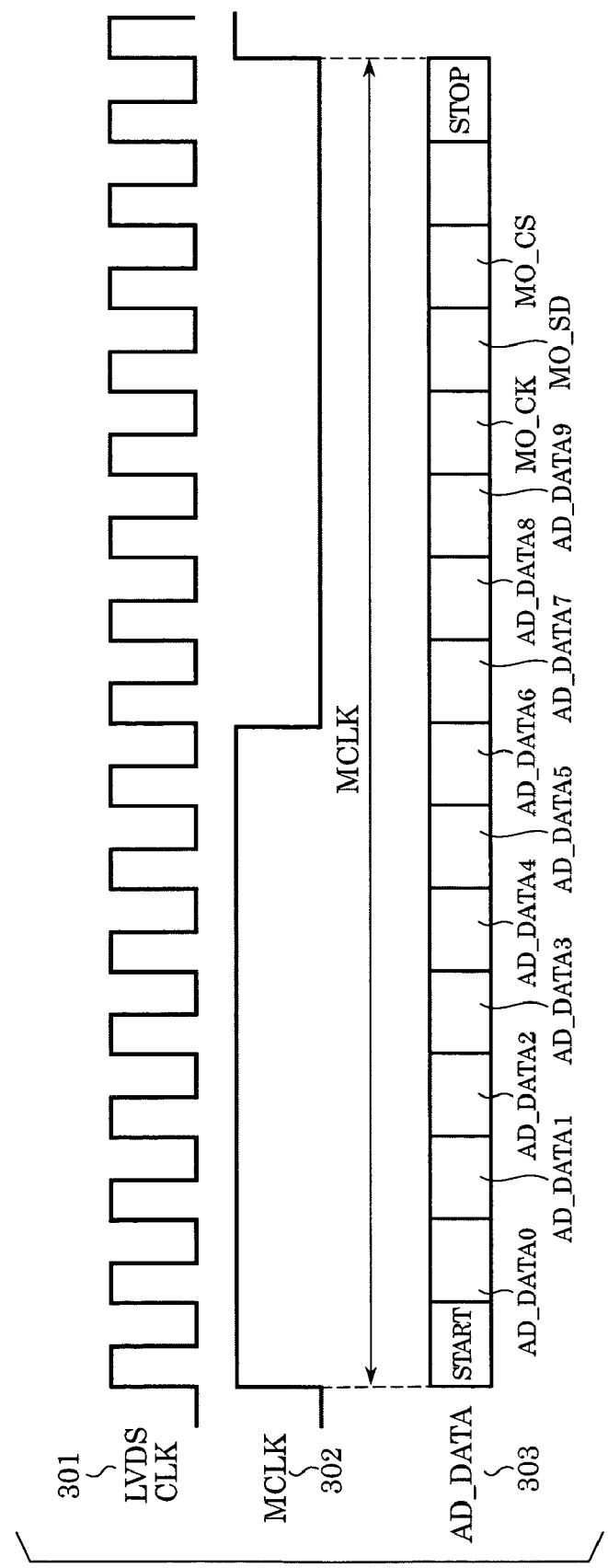
FIG. 13 is a waveform chart illustrating a serial signal to be output from a parallel-to-serial converter 108 according to the fourth embodiment.

FIG. 13 is a waveform chart illustrating a serial signal to be output from the parallel-to-serial converter 108 according to the present embodiment. In FIG. 13, reference numeral 301 denotes a serial transfer clock signal (LVDS_CLK) generated at the PLL unit 109 by multiplying an image data timing signal (MCLK) 302 inputted as a latch clock. The image data timing signal 302 is generated at the timing generator 104. Reference numeral 303 denotes 10-bit image data contents (AD_DATA) in the event of converting AD-converted 10-bit image data signals to be output from the CDS/AGC&AD 103, a synchronous serial communication transfer clock (MO_CK) for the micro-controller 111 outputting each motor position to the digital camera function IC 121, synchronous serial data (MO_SD), and a chip selection (MO_CS) signal for activating a synchronous serial communication into a serial signal.

The serial transfer clock signal (LVDS_CLK) 301 converts 16 bits in total, obtained by adding 3-bit synchronous serial communication bits, a blank bit, and start and stop bits to the 10-bit image data (AD_DATA) signals to be parallel-input into a serial signal during one image data timing signal (MCLK) 302. Accordingly, the relation wherein image data timing signal (MCLK) 302×total bits (16)=serial transfer clock signal (LVDS_CLK) 301 holds. Even in this case, the image data timing signal (MCLK) 302 is synchronized with the 10-bit image data (AD_DATA) signals, and also the transfer clock (MO_CK) is a low-speed such as 1 MHz, so even in the event that the parallel-to-serial converter 108 latches the image data signal in sync with the image data timing signal (MCLK) 302, there is no problem.

Figure 14:
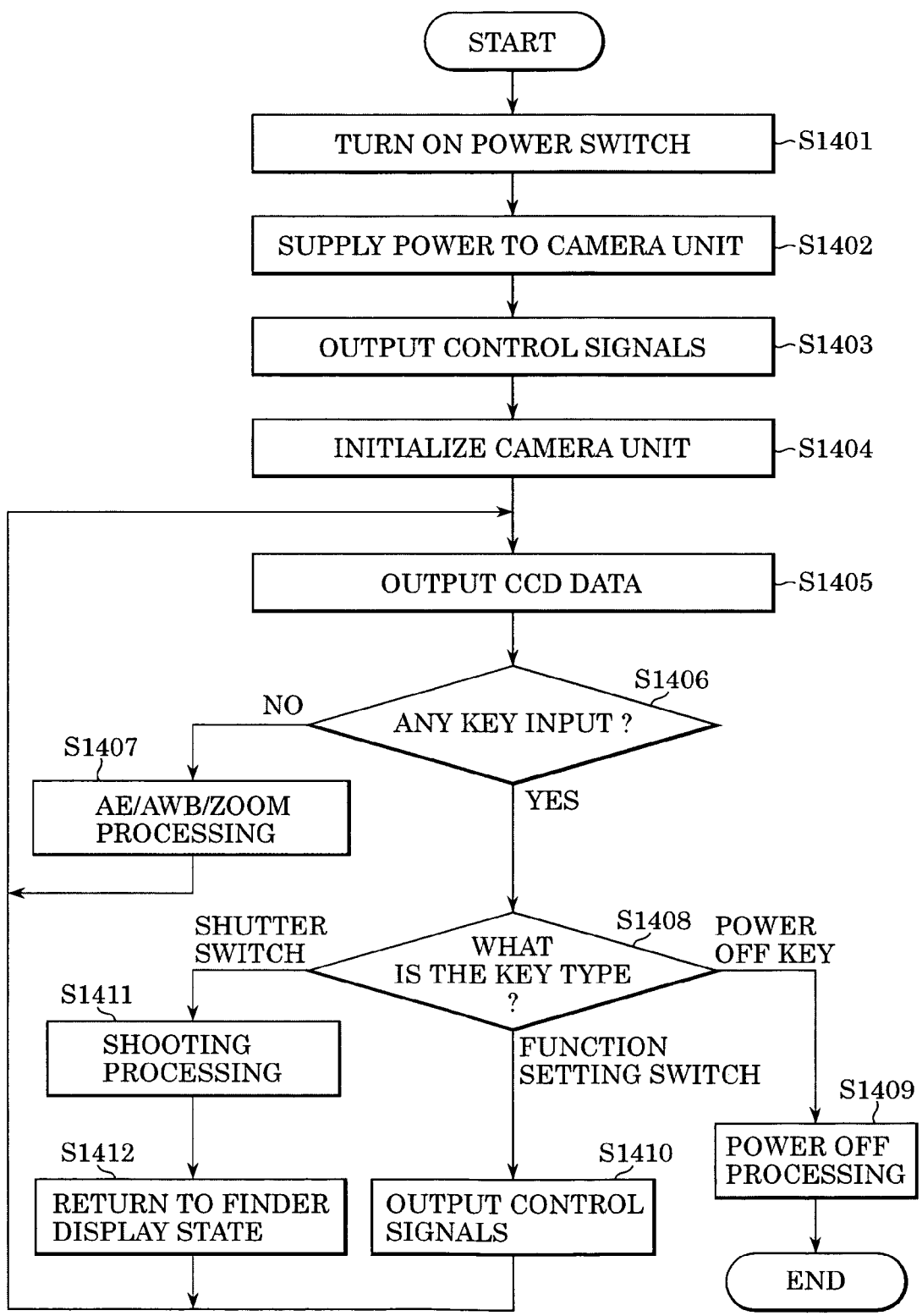
FIG. 14 is a flowchart illustrating the flow of a series of processing from turning on power in the event of connecting the camera unit with the main unit, according to the fourth embodiment.

FIG. 14 is a flowchart illustrating the flow of a series of processing from turning on power in the event of connecting the camera unit 100 with the main unit 120, according to the present embodiment. FIG. 15 is a table showing the content of synchronous serial communication between the micro-controller 111 and digital camera function IC 121, according to the present embodiment of the present invention. This synchronous serial communication is made up of 8 bits×7 words, and output to the digital camera function IC 121 from the micro-controller 111 and output to the micro-controller 111 from the digital camera function IC 121 are performed using the same format.

In FIG. 15, reference numeral 511 denotes a header (fixed value of F9 hex) in synchronous serial communication, while reference numeral 517 denotes a footer (fixed value of F6 hex). Reference numeral 512 denotes motor selection data of a motor to be driven or a driving motor, reference numeral 513 denotes position data indicating the amount of movement and the current position regarding the motor selected by the motor selection data 512, reference numeral 514 denotes the selection signal of a sensor to be detectable, and reference numeral 515 denotes sensor status data indicating the status of the detectable sensor selected by the sensor selection data 514. In the event of still image capturing using a CCD, there is the need to close the shutter during a CCD readout period so as to shield incident light to the CCD in order to prevent smearing from occurring and color balance from being lost. Reference numeral 516 denotes a checksum value adjusted so as to obtain FF hex when adding all data, checksum, header, and footer. When the micro-controller 111 or the digital camera function IC 121 receives and adds data from W1 to W7 (511 to 517) in synchronous serial communication, unless the sum thereof is FF hex, a determination is made that an error of some sort has occurred in the communication, and the communication is performed again. The relation between the VD signal, CSUB signal, and shutter mechanism control signals in still image capturing is the same in FIG. 5 as described above.

A description will now be provided with reference to FIGS. 11 through 15 and FIG. 5 regarding the process flow, according to the present embodiment, in the event that the camera unit 100 and the main unit 120 are connected and power is turned on.

Turning to FIG. 14, first, upon an operator pressing the power switch (not shown) of the main unit 120 (Step S1401), the digital camera function IC 121 is activated from the sleep mode, performs the initial processing of the main unit 120, and supplies power to the camera unit 100 (Step S1402).

Following completion of the initial processing of the main unit 120, the digital camera function IC 121 begins to supply the timing generator reference clock (CLK) 202, and outputs a horizontal synchronization signal (HD)/vertical synchronization signal (VD)/synchronous serial (SSI and TG_CS signals)/reset signal/CSUB signal/shutter control signals/motor control synchronous serial communication signal for performing initial control of the timing generator 104, CDS/AGC&AD 103, CCD 102, shutter mechanism within the lens unit 101, focus motor, zoom motor, and display data output (Step S1403).

Note that the timing generator reference clock (CLK) 202 is continuously supplied while the camera unit 100 runs. The aforementioned respective control signals are converted into a serial signal, such as the serial data contents 203, by the parallel-to-serial converter 127 to which the serial transfer clock signal (LVDS_CLK) 201 generated by the PLL unit 129 is supplied. The transmission driver 128 outputs the serial signal to the cable 112 as a high-speed serial signal.

Upon the reception driver 106 receiving the high-speed serial signal via the cable 112, the reception driver 106 inputs the serial signal to the serial-to-parallel converter 105. In response to the serial signal, the serial-to-parallel converter 105 converts the serial data of the serial data contents 203 into parallel data, i.e., the original horizontal synchronization signal (HD)/vertical synchronization signal (VD)/synchronous serial (SSI and TG_CS signals)/reset signal/CSUB signal/ shutter control signals, and supplies the parallel data to the timing generator 104, CDS/AGC&AD 103, CCD 102, and shutter mechanism within the lens unit 101.

Also, the clock recovery unit 107 returns the timing generator reference clock (CLK) 202 from the frequency of the serial signal and the number of bits of the serial data contents 203, and supplies the timing generator reference clock (CLK) 202 to the timing generator 104. In response to the timing generator reference clock (CLK) 202, the timing generator 104 generates the image data timing signal (MCLK) 302 by dividing this signal into two, supplies the image data timing signal (MCLK) 302 to the PLL unit 109, and also starts to supply a driving reference signal to the CCD 102 and CDS/ AGC&AD 103. Each device within the camera unit 100 to which these control signals and the driving signal are supplied performs initial processing for display data output based on the contents of the signals (Step S1404).

Following completion of the initial processing, the image data is output to the CDS/AGC&AD 103 from the CCD 102, the CDS/AGC&AD 103 AD-converts the image data into 10-bit digital image data, and then outputs this to the parallel-to-serial converter 108. The parallel-to-serial converter 108 converts the 10-bit digital image signals into a serial signal, such as the serial data contents 303, using the serial transfer clock signal (LVDS_CLK) 301 to be supplied from the PLL unit 109. The transmission driver 110 outputs the serial signal to the cable 113 as a high-speed serial signal (Step S1405).

Upon the reception driver 131 receiving the high-speed serial signal via the cable 113, the reception driver 131 inputs the serial signal to the serial-to-parallel converter 130. In response to the serial signal, the serial-to-parallel converter 130 converts the serial signal of the serial data contents 303 into parallel signals, i.e., the original 10-bit parallel digital image signals, and supplies the parallel signals to the digital camera function IC 121. Also, the clock recovery unit 132 returns the image data timing signal (MCLK) 302 from the frequency of the serial signal and the number of bits of the serial data contents 303, and supplies the image data timing signal (MCLK) 302 to the digital camera function IC 121.

Through these series of actions, the image data output from the CCD is transferred to the digital camera function IC 121, where the digital camera function IC 121 performs image processing such as AE (Auto Exposure) control, AWB (Auto White Balance) control, zoom processing for changing the field angle, or the like (Step S1407), and the image data is displayed on the display unit 125. This is a finder display state. AE control at this time is realized by the digital camera function IC 121 determining a luminance level calculated based on the image data to be output from the CDS/AGC&AD 103, and changing the register value of the electronic shutter within the timing generator 104, and the register value of gain setting within the CDS/AGC&AD 103 through each synchronous serial communication.

Zoom control at this time is realized by the digital camera function IC 121 performing synchronous serial communication following selecting a zoom motor with reference to the motor selection data 512 and setting a zoom motor position to the position data 513 depending on the time when the user presses the zoom key. The micro-controller 111, which has completed movement of the motor, sets the moved motor to the motor selection data 512, sets the position following completion of the movement to the position data 513, and then outputs this data to the digital camera function IC 121. Consequently, the motor movement processing is complete.

While viewing the image data to be displayed on the display unit 125, the operator performs key operations for still image capturing or function modification operations. While the digital camera function IC 121, performs the display processing in a finder display state, the digital camera function IC 121 always monitors input of various types of operating keys (now shown)(Step S1406). In the event that the digital camera function IC 121 detects no key input, the flow proceeds to step S1407, and finder display is performed as described above. On the other hand, in the event that the digital camera function IC 121 detects any key input in the key monitoring state in Step S1406, key-type determination processing is performed (Step S1408).

In Step S1408, in the event that the digital camera function IC 121 detects that the input key is a power-off switch, the digital camera function IC 121 stops display to the display unit 125, stops power supply to the camera unit 100, and performs further power-off processing in which the digital camera function IC 121 itself enters the sleep mode (Step S1409). The processing is then completed.

In Step S1408, in the event that the digital camera function IC 121 detects that the input key is a function setting switch, and there is a function setting modification (parameter modification) related to the camera unit 100, the digital camera function IC 121 performs a setting modification by outputting the setting contents according to the modification to the timing generator 104 and CDS/AGC&AD 103 using synchronous serial communication (Step S410).

In Step S1408, in the event that the digital camera function IC 121 detects that the input key is a shutter switch for instructing still image capturing, the flow proceeds to step S1411, where shooting processing occurs.

First, the digital camera function IC 121 performs internal settings for still image capturing such as stopping of automatic exposure (AE) control or automatic white balance (AWB) control, or the like, and then performs auto-focus processing. The auto-focus processing can be performed by the digital camera function IC 121 determining a focus state based on adjacent luminance signal difference calculated from image data to be output from the CDS/AGC&AD 103, and controlling the focus motor to move to a position where luminance signal difference becomes the largest.

Focused pictures can be taken by making the transition to still image capturing following completion of the auto-focus processing. This control of a focus motor is performed by the digital camera function IC 121 selecting a focus motor using the motor selection data 512, setting a focus motor position in increments of a predetermined step to the position data 513, and then performing synchronous serial communication. Following completion of a predetermined amount of movement, the micro-controller 111 sets the moved motor to the motor selection data 512, sets the position following completion of movement to the position data 513, and then outputs this data to the digital camera function IC 121, and consequently, the focus motor movement processing is complete.

Following completion of the auto-focus processing, the digital camera function IC 121 makes the board bias control (CSUB) signal 502 for controlling storage electrical charges during an exposure period a high-level as to the camera unit 100 in sync with change in the vertical synchronization signal (VD) 501, and subsequently, performs synchronous serial communication for instructing that a readout period starts from the next vertical synchronization signal (VD) 501 as to the timing generator 104. Next, the digital camera function IC 121 outputs the close shutter signal 503 for closing the shutter in sync with change in the next vertical synchronization signal (VD) 501.

The vertical synchronization signal (VD) 501 outputted from the digital camera function IC 121 becomes a readout period of the CCD 102 data following completion of an exposure period. In the event that the CCD 102 is 200 million pixels, an ODD frame (EVEN frame in some CCDs) readout period is complete during double the exposure period, and one vertical synchronization signal (VD) 501 is output. Next, an EVEN frame (ODD frame in some CCDs) readout period starts, following double the exposure period, one vertical synchronization signal (VD) 501 is output, and a normal action state is recovered. The synchronous serial communication 506 for recovering the timing generator to a normal action state is performed during this EVEN frame (ODD frame in some CCDs) readout period, and further, the open shutter signal 504 is output so as to open the shutter in sync with the next vertical synchronization signal (VD) 501. Finally, upon the digital camera function IC 121 determining that readout of all of the CCD data (serial data contents) 303 is complete, the digital camera function IC 121 makes the board bias control signal (CSUB) 502 a low-level, and also generates a still JPEG image based on all of the CCD data 303 read, and then the image capturing processing in Step S1411 is complete.

Following generation of the JPEG image, the digital camera function IC 121 modifies the internal settings so as to perform normal finder display, and then returns to the finder display state (Step S1412).

Fifth Embodiment

With the above-described fourth embodiment, the micro-controller 111 performs control of a focus motor and zoom motor, and the digital camera function IC 121 performs control of the CCD 102 and shutter in still image capturing, but the same advantage may be expected by the micro-controller 111 performing the control of the CCD 102 and shutter in still image capturing as well.

Figure 16:
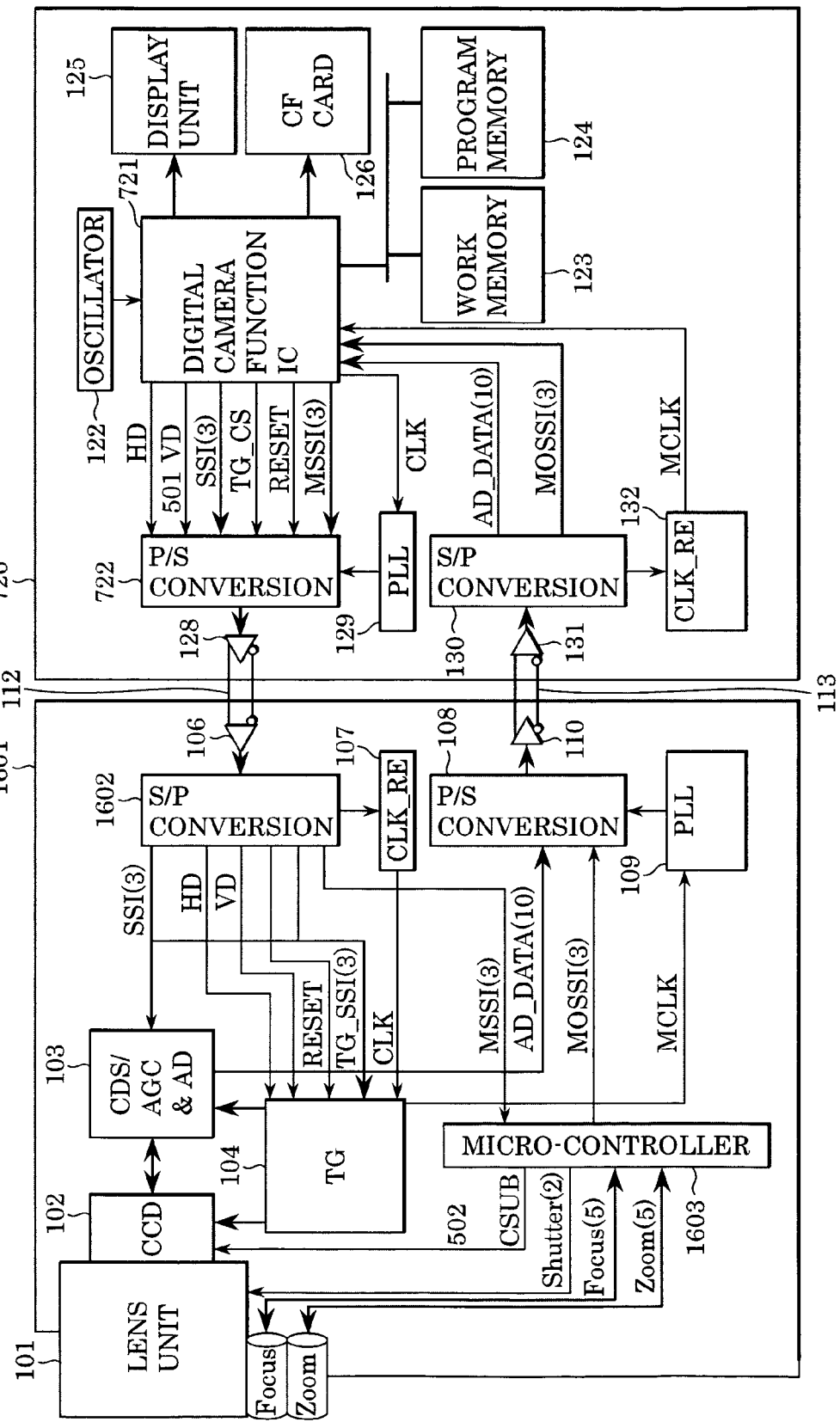
FIG. 16 is a block diagram illustrating the schematic configuration of a separation-type image capturing system according to a fifth embodiment of the present invention.

FIG. 16 is a block diagram illustrating the schematic configuration of a separation-type image capturing system according to a fifth embodiment of the present invention. In FIG. 16, reference numeral 1601 denotes a camera unit according to the fifth embodiment, reference numeral 1602 denotes a serial-to-parallel converter according to the fifth embodiment, reference numeral 1603 denotes a micro-controller for controlling the board bias control signal (CSUB) and shutter control signal (Shutter). Reference numeral 720 denotes a main unit according to the fifth embodiment, reference numeral 721 denotes a digital camera function IC for outputting the board bias control signal (CSUB) and shutter control signal (Shutter) using synchronous serial communication, and reference numeral 722 denotes a parallel-to-serial converter according to the fifth embodiment.

Figure 17:
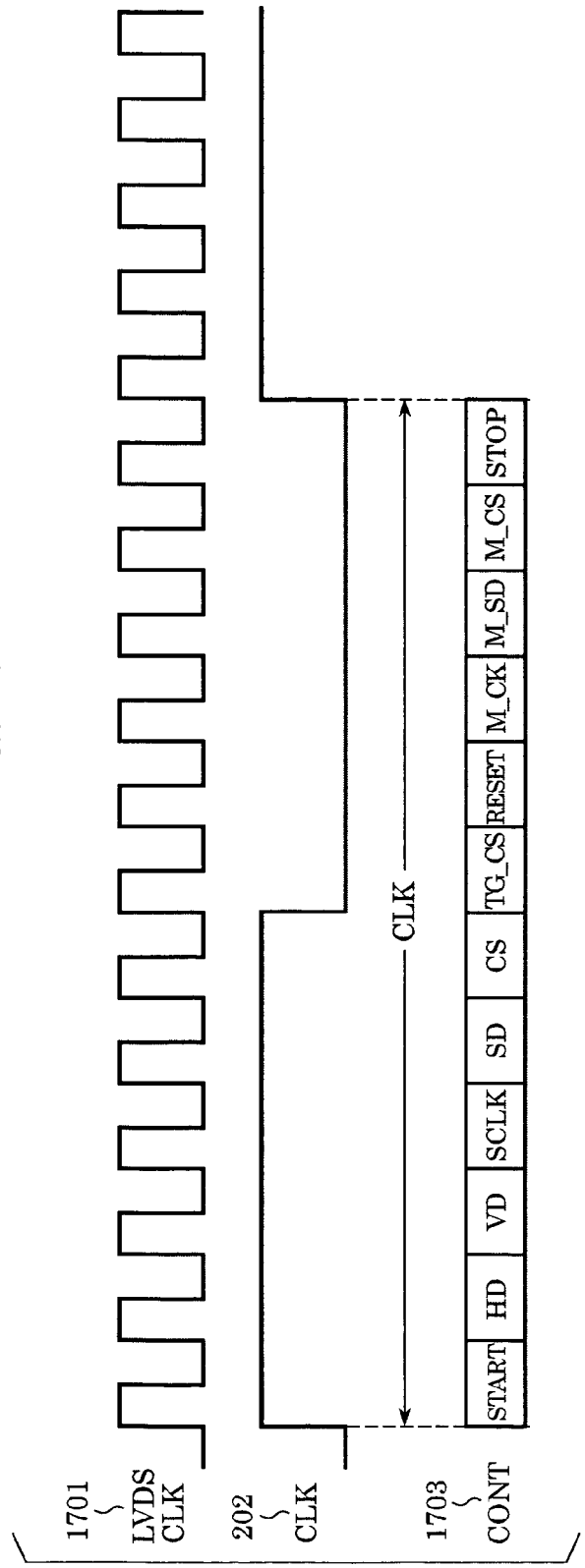
FIG. 17 is a waveform chart illustrating a serial signal to be output from a parallel-to-serial converter according to the fifth embodiment.

FIG. 17 is a waveform chart illustrating a serial signal to be output from the parallel-to-serial converter 722 according to the fifth embodiment of the present invention. In FIG. 17, 1701 denotes a serial transfer clock signal (LVDS_CLK) which can be used within the parallel-to-serial converter 722. With the fifth embodiment, the number of parallel bits is less than that in the fourth embodiment. Accordingly, the serial transfer clock signal (LVDS_CLK) 1701 is suppressed in a low frequency as compared to that in the fourth embodiment. Reference numeral 1703 denotes serial data contents (CONT) in the fifth embodiment. A description will now be made regarding the fifth embodiment with reference to FIGS. 15 through 17.

The digital camera function IC 721 performs the same actions as with the fourth embodiment in a normal finder display state. However, in the event that the digital camera function IC 721 determines that there is any key input, particularly that the key is the shutter switch for instructing still image capturing, the digital camera function IC 721 performs synchronous serial communication with the micro-controller 1603 for controlling the board bias control signal (CSUB) 502 during the vertical synchronization signal (VD) 501 period indicating start of an exposure period.

Processing of the board bias control signal (CSUB) 502 is executed by the micro-controller 1603 when the digital camera function IC 721 selects the board bias control signal (CSUB) 502 at the motor selection data 512, and performs synchronous serial communication with the micro-controller 1603. When the micro-controller 1603 completes the processing of the board bias control signal (CSUB) 502, the micro-controller 1603 sets the board bias control signal (CSUB) 502 at the motor selection data 512, and outputs this to the digital camera function IC 721, and consequently, the processing of the board bias control signal (CSUB) 502 is complete.

The digital camera function IC 721 performs synchronous serial communication for closing the shutter with the micro-controller 1603 when a readout period starts following an exposure period. The digital camera function IC 721 performs synchronous serial communication for opening the shutter and the processing of the board bias control signal (CSUB) 502 with the micro-controller 1603 in sync with the vertical synchronization signal (VD) 501 following completion of a readout period.

Sixth Embodiment

With the above-described fourth embodiment, the function related to motor control is performed by the micro-controller 111, but the function may be expanded without increasing the number of parallel input bits by employing this micro-controller as sensor input means such as an infrared sensor, temperature sensor, human-sensitive sensor, or the like.

Figure 18:
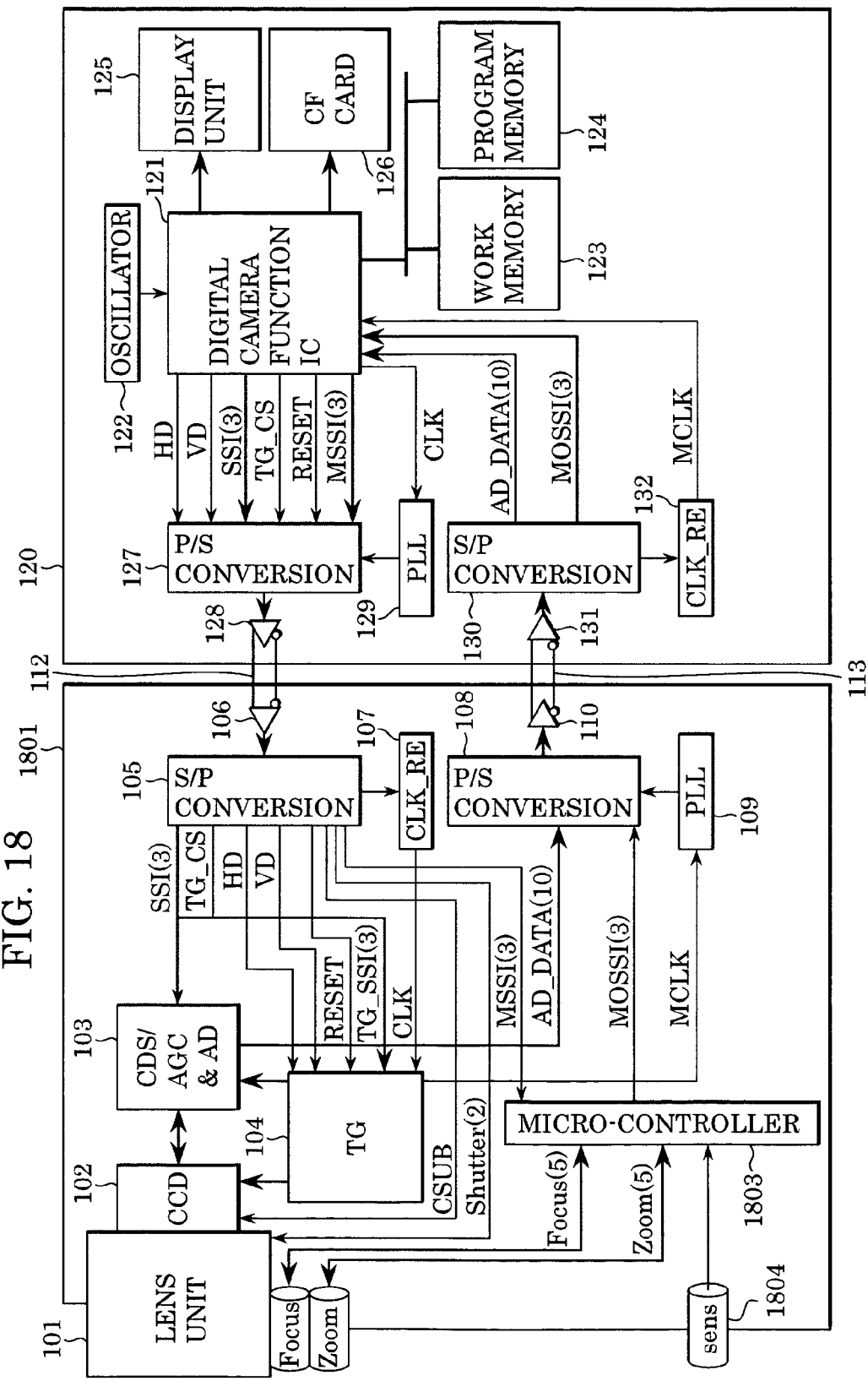
FIG. 18 is a block diagram illustrating the camera unit and the main unit, according to a sixth embodiment of the present invention.

FIG. 18 is a block diagram illustrating the camera unit and the main unit, according to a sixth embodiment of the present invention. In FIG. 18, reference numeral 1801 denotes a camera unit according to the sixth embodiment of the present invention, reference numeral 1803 denotes a micro-controller capable of sensor input, and reference number 1804 denotes a sensor input unit, such as an infrared sensor, temperature sensor, human-sensitive sensor, or the like.

In FIG. 18, the digital camera function IC 121 sets a sensor of which detection should be activated to the sensor selection data 514, and outputs this data to the micro-controller 1803 in synchronous serial communication. In response to this communication, the micro-controller 1803 activates a sensor 1804 set to the sensor selection data 514, and also sets the state of the sensor 1804 to the sensor data unit 515, and then performs synchronous serial communication with the digital camera function IC 121. Repeating this communication allows image capturing to be started or stopped automatically depending on the state of the sensor 1804.

As described above, with a system wherein the main unit and the camera unit perform high-speed serial communication with LVDS, even if a camera system controls multiple motors by providing a micro-controller for controlling multiple motors within the camera unit, and inputting/outputting a signal for controlling this micro-controller from/to the parallel-to-serial converter as well as the image control signals, each embodiment of the present invention allows the number of LVDS input bits to be suppressed. Thus, the serial conversion frequency of LVDS is suppressed, choices of a cable for connecting the main unit with the camera unit are expanded, and reduction in consumption power and reduction in noise to be generated are realized.

Alternatively, expanded functions such as on/off of a sensor function would enable realization of automatic image capturing of images without changing the number of LVDS input bits by controlling the micro-controller to process sensor input such as an infrared sensor, human-sensitive sensor, or the like.

Note that even in the event that the micro-controller is an ASIC which runs by analyzing serial communication to be output from the main unit, the same advantages may be expected.

The present invention has been described with reference to the specific embodiments listed above. The present invention, however, is not restricted to the aforementioned embodiments, and it is fully apparent that one skilled in the art can make various modifications and substitutions to the embodiments without departing from the spirit and scope of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-036811 filed Feb. 13, 2004, and Japanese Patent Application No. 2004-116936 filed Apr. 12, 2004, which are hereby incorporated by reference herein.

What is claimed is:

1. A method for controlling an image capturing system including an image-capturing unit and a main unit and capable of serial communication between the image-capturing unit and the main unit;

wherein the main unit generates a first clock signal, converts data to be transmitted to the image-capturing unit into serial data using the first clock signal, and transmits the serial data to the image-capturing unit; and wherein the image-capturing unit detects a serial transfer frequency from the serial signal received from the main unit, returns the first clock signal, generates a second clock signal from the recovered first clock signal, converts a taken image into serial data using the second clock signal, and transmits the serial data to the main unit; and wherein the main unit returns the second clock signal from the serial data transmitted from the image-capturing unit, and synchronizes with the image-capturing unit by utilizing the recovered second clock signal for generating the first clock signal.

* * * * *